(12) United States Patent
Martel et al.

(10) Patent No.: US 10,419,808 B2
(45) Date of Patent: Sep. 17, 2019

(54) SYSTEM AND METHOD FOR SCALABLE PHYSICAL LAYER FLOW OF PACKETIZED MEDIA STREAMS

(71) Applicant: GVBB HOLDINGS S.A.R.L., Luxembourg (LU)

(72) Inventors: Stephane Martel, Montreal (CA); Charles S. Meyer, Crystal Bay, NV (US)

(73) Assignee: GVBB HOLDINGS S.A.R.L., Luxembourg (LU)

(*) Notice: Subject to any disclaimer, the term of this patent is extended or adjusted under 35 U.S.C. 154(b) by 74 days.

(21) Appl. No.: 15/698,273

(22) Filed: Sep. 7, 2017

(65) Prior Publication Data

US 2018/0070126 A1 Mar. 8, 2018

Related U.S. Application Data

(60) Provisional application No. 62/385,205, filed on Sep. 8, 2016, provisional application No. 62/483,270, filed on Apr. 7, 2017.

(51) Int. Cl.
| | |
|---|---|
| *H04N 21/43* | (2011.01) |
| *H04N 21/4402* | (2011.01) |
| *H04N 21/4385* | (2011.01) |
| *H04L 29/06* | (2006.01) |

(52) U.S. Cl.
CPC ..... *H04N 21/4302* (2013.01); *H04L 65/4084* (2013.01); *H04L 65/604* (2013.01); *H04L 65/608* (2013.01); *H04L 65/80* (2013.01); *H04L 69/14* (2013.01); *H04N 21/440227* (2013.01); *H04N 21/4385* (2013.01)

(58) Field of Classification Search
CPC . H04L 65/4084; H04L 65/604; H04L 65/608; H04L 65/80; H04L 69/14; H04N 21/4302; H04N 21/4385; H04N 21/440227
See application file for complete search history.

(56) References Cited

U.S. PATENT DOCUMENTS 6,792,484 B1 * 9/2004 Hook ............... G06F 13/1642
710/29
2007/0237185 A1 10/2007 Pereira et al.

FOREIGN PATENT DOCUMENTS

| WO | 2009018118 A1 | 2/2009 |
|---|---|---|
| WO | 2013131561 A1 | 9/2013 |

OTHER PUBLICATIONS

International Search Report & Written Opinion issued in PCT/EP2017/072663 dated Dec. 11, 2017.

* cited by examiner

*Primary Examiner* — Anner N Holder
(74) *Attorney, Agent, or Firm* — Arent Fox LLP

(57) ABSTRACT

A media stream receiver is provided for scalable physical layer flow of packetized media streams. The media stream receiver replicates the processing block in time, rather than in hardware, through the use of a single shared memory and pointer alignment calculations, which combines multiple buffering stages as the single, shared memory buffer to offer redundancy and alignment, while acting as a receiver buffer to account for packet delay variations. By doing so the media stream receiver can perform a vertical interval switch between received media streams.

25 Claims, 11 Drawing Sheets

SYSTEM AND METHOD FOR SCALABLE PHYSICAL LAYER FLOW OF PACKETIZED MEDIA STREAMS

CROSS-REFERENCE TO RELATED APPLICATIONS

This application claims priority to U.S. Patent Provisional Application No. 62/385,205, filed Sep. 8, 2016, and to U.S. Patent Provisional Application No. 62/483,270, filed Apr. 7, 2017, the entire contents of each of which are hereby incorporated by reference.

TECHNICAL FIELD

The system and method disclosed herein relates to transmission and reception of packetize media streams, and, more particularly, to a system and method for scalable physical layer flow of packetized media streams.

BACKGROUND

Media channels, such as audio and video channels, have long been transmitted using application specific cables. More recently, media signals have been transmitted on computer based networks using protocols such as unicast or multicast. Unicast is a method of sending packets on a computer network to a single destination. Multicast is a protocol for efficiently sending data streams to multiple receivers at the same time on TCP/IP networks by use of a multicast address. The computer network then operates to route the packets to each of the devices on the network that wish to receive the multicast packets.

However, one technical issue is that when media signals are transmitted to a receiver, IP packets in the signal can often be lost due to various connection issues. In order to recover lost IP packets and reconstruct original streams, media networks can allow for redundant media packet streams to be transmitted and received. For example, a transmitter using the SMPTE 2022-7 communication standard duplicates the input stream and sends it via two different paths to the destination receiver. FIG. 1 illustrates a block diagram of a conventional system using redundancy (i.e., "seamless protection switching") to reconstruct a data stream with lost IP packets.

As shown, the system includes a transmitting device 10 and a receiving device 20 (both referred to as "edge" devices) that communicate by one or many IP data communication networks 30. Using the SMPTE 2022-7 standard, for example, the transmitter 10 continually processes the primary media packet input stream, duplicates the stream, and transmits it via the network 30 over two separate paths in the network (or two or more separate networks, for example). The receiver 20 combines the streams from both paths and reconstructs the original stream. Thus, path 1 can provide a primary data flow and path 2 can provide a redundant data flow. If a packet is lost in path 1, the receiver 20 is configured to take the pack from path 2. If path 1 is completely gone (i.e. a broken transmission path in the network), the receiver switches to path 2. Once the switch occurs, the receiver 20 ignores the primary media packet stream and processes the redundant copy from path 2.

As such technologies continue to develop, receiving devices (e.g., receiving device 20) that receive IP based media signals according to the SMPTE 2022-7 standard, as well as other suites of standards including SMPTE 2022-6, AES-67 and the upcoming SMPTE 2110 standard, must be more flexible than their serial digital interface ("SDI") predecessors. The requirements for these network ports include redundancy, different media types, each with a different bandwidth, different counts of each signal type, etc.

These signal types, now generally referred to as "flows", may each need some processing specific to their type, audio or video, or workflow application, redundant, precision timing, and the like. Currently, before these steps can be taken, every flow is processed identically. That is, the MAC addresses, IP addresses and as needed, the UDP port addresses, are parsed prior to the real-time transport protocol ("RTP") header being examined.

In the conventional approach, once the Ethernet payload is extracted, a dedicated processing block, hardware or software, can act upon the IP datagram. Moreover, each unique data flow, requires its own parser and processor. For example, to support SMPTE 2022-7 network redundancy, a second port's Ethernet payload is extracted and fed to dedicated processing blocks for IP datagram processing. SMPTE 2022-7 datagram processing requires that the RTP headers of two pre-identified flows are compared and the best flow will always be used as described above. In this instance, there is a need to align matching RTP datagrams in time, based upon their header value, in order to create a perfectly clean switch.

This last requirement is met by adding memory to essentially record data of a certain duration, to ensure enough time is captured to allow for the alignment of the two flows, arriving from mirrored, but separate networks (e.g., paths 1 and 2 shown in FIG. 1).

SUMMARY

Accordingly, the proposed system and method provides for scalable physical layer flow of packetized media streams. In one aspect, the disclosed system is implemented in hardware as a field-programmable data array ("FPGA") configuration, but can also be implemented through a combination of hardware and software components. In the case of the FPGA design, the replication of hardware resources results in limitation of unique flows that can be supported. Accordingly, the disclosed system and method replicates the processing block in time, rather than in hardware, through the use of shared memories and pointer alignment calculations. As will be described herein, multiple buffering stages can be combined as a single, shared memory buffer to offer redundancy and alignment, while acting as a receiver buffer to account for packet delay variations.

In an additional application of the design, the system described herein is configured to buffer the "live" flow to compensate for differential delay (i.e., packet delay variation), in the network plus some latency for vertical time position variance. This design facilitates, inter alia, receiver switches between two flows, at an identical point in time, which is also the vertical interval. A COTS IP router will not cleanly switch a video media flow, at vertical interval using IGMP, the preferred method for the industry. The buffering of data flows described herein facilitates a vertical interval switch. Thus, the disclosed system and method provides a switch between, and among, multiple media flows, based on their RTP sequence number values and RTP marker bit. The switch occurs by carefully managing multiple memory pointers to write into a common receiver buffer from multiple pointer address when writing packets in memory.

Advantageously, the disclosed receiver combines all media buffers as a single shared media buffer and directs access of the streams using fetching control instructions. By combining the media buffers into a single shared buffer, the disclosed receiver system reduces the need for additional DDR (double data rate) memory, making the disclosed system power efficient and cost effective, as well as saving significant FPGA resources. In conventional receiving system, each of the following stages requires buffering: absorb packeting delay variations, reordering of packets based on sequence numbers, providing stream alignment for packet redundancy, providing clock domain change to media clocks, and providing alignment of video to a video reference (i.e., frame buffer) and frame synchronization with reference. The disclosed receiver achieves all of these functionality while minimizing software and hardware requirements by using a single shared memory buffer and providing a packet processor that manages the recording and fetch of data packets to and from the shared memory using multiple memory pointers.

Accordingly, the disclosed system and method provides for efficient usage of both memory and FPGA resources by combining multiple media processing stages using a single memory media buffer. This provides for the aligning and vertically switching of video in the packet domain with no additional memory while maintaining redundancy during the switch. Moreover, the disclosed receiving system is configured to reorder packets and absorb packet delay variations using the same buffer and perform frame synchronization in the packet domain by reusing the same receiver buffer. Furthermore, the disclosed media receiving system can provide packet level redundancy using the same buffer and account for potential skew between two redundant flows. As a result, the necessary FPGA resources do not increase linearly with the number of flows, resulting in a highly scalable media stream receiving system.

Thus, according to an exemplary aspect, a media stream receiving system is provided for receiving and aligning a plurality of media streams to perform vertically accurate switching during media stream playout. In this aspect, the media stream receiving system includes at least a pair of input ports configured to receive first and second media streams, respectively, each of the first and second media streams having a plurality of data packets; at least one data packet parser configured to parse the data packets of each of the first and second media streams to identify first and second flow identifiers for the first and second media streams, respectively, and respective sequence number indexes of each parsed data packet of the first and second media streams; and a data packet recorder including at least a pair of recorder channels configured to receive the first and second media streams from the at least one data packet parser and to route the received first and second media streams to a target player selector that is configured to store the respective data packets of the first and second media streams in a single shared media stream buffer having at least a pair of separate memory banks according to the determined sequence number indexes. Moreover, the system includes a data packet player having a plurality of packet player channels and configured to fetch the respective data packets of the first and second media streams stored in the single shared media stream buffer and route the fetched data packets to at least one media essence decapsulator for playout of the first and second media streams on at least one A/V device; and a memory pointer supervisor coupled between the data packet recorder and the data packet player and configured to provide data packet fetching control instructions to the data packet player based on the determined first and second flow identifiers and the determined sequence number indexes of each parsed data packet of the first and second media streams. According to the exemplary system, the data packet player includes a data flow selector coupled to the plurality of packet player channels and configured to fetch the respective data packets of the first and second media streams based on the data packet fetching control instructions received from the memory pointer supervisor, the at least one media essence decapsulator controls a timing for the data packet player according to a system clock to fetch the respective data packets of the first and second media streams to prevent the data packet player from fetching at least one data packet at an address in the single shared media stream buffer before the packet recorder has stored a corresponding data packet at the address in the single shared media stream buffer, and the data flow selector of the data packet player is configured to vertically switch in the packet domain the playout on the at least one A/V device based on the data packet fetching control instructions provided by the memory pointer supervisor.

In another exemplary embodiment, a media stream receiver is provided for receiving and aligning a plurality of media streams to perform vertically accurate switching during media stream playout. In this aspect, the media stream receiving system includes at least one data packet parser configured to parse data packets of each of a plurality of streams to identify respective flow identifiers for each of the plurality of media streams and respective sequence number indexes of each parsed data packet of the plurality of media streams; a data packet recorder configured to store the respective data packets of the plurality of media streams in a single shared media stream buffer having at least a pair of separate memory banks, wherein the data packets are stored in the single shared media stream buffer based on the determined sequence number indexes for each parsed data packet; a data packet player configured to fetch the respective data packets of the plurality of media streams stored in the single shared media stream buffer and route the fetched data packets to at least one media essence decapsulator for playing out on at least one A/V device; and a memory pointer supervisor coupled between the data packet recorder and the data packet player and configured to provide data packet fetching control instructions to the data packet player based on the determined flow identifiers and the determined sequence number indexes of each parsed data packet of the plurality of second media streams. Moreover, in this aspect, the data packet player fetches the respective data packets of the plurality of media streams based on the data packet fetching control instructions received from the memory pointer supervisor and is further configured to vertically switch the playing out on the at least one A/V device between the plurality of media streams based on the data packet fetching control instructions received from the memory pointer supervisor.

According to yet another embodiment, a media stream receiver is provided for receiving and aligning a plurality of media streams to perform vertically accurate switching during media stream playout. In this aspect, the media stream receiver includes a data packet recorder configured to receive a plurality of media streams experiencing packet delay variations and to reorder and store data packets of the plurality of media streams in a correct sequence in a single shared media buffer based on parsed indexing information; and a data packet player configured to fetch the stored data packets in the single shared media buffer and to vertically switch playout of the plurality of media streams on at least one A/V device.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
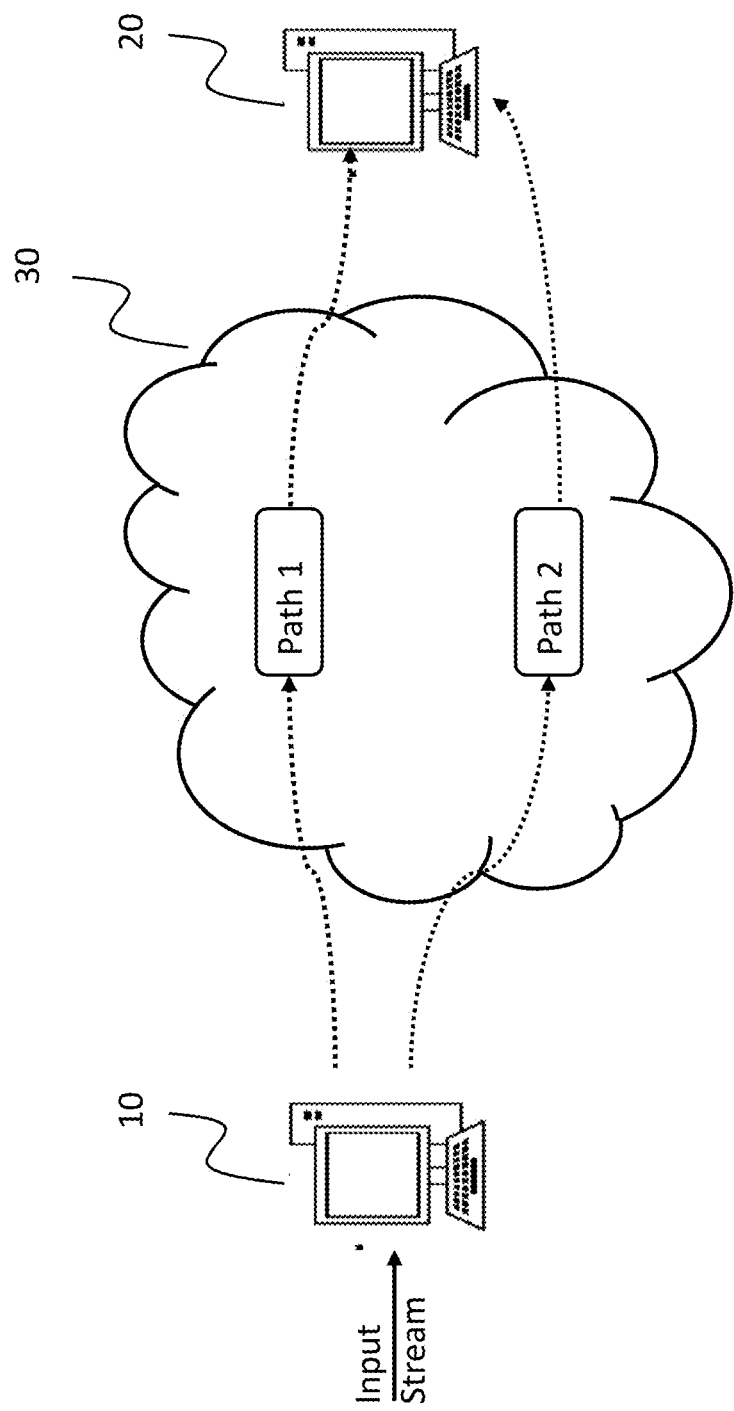
FIG. 1 illustrates a block diagram of a conventional system using redundancy (i.e., "seamless protection switching") to reconstruct a data stream with lost IP packets.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Figure 2A:
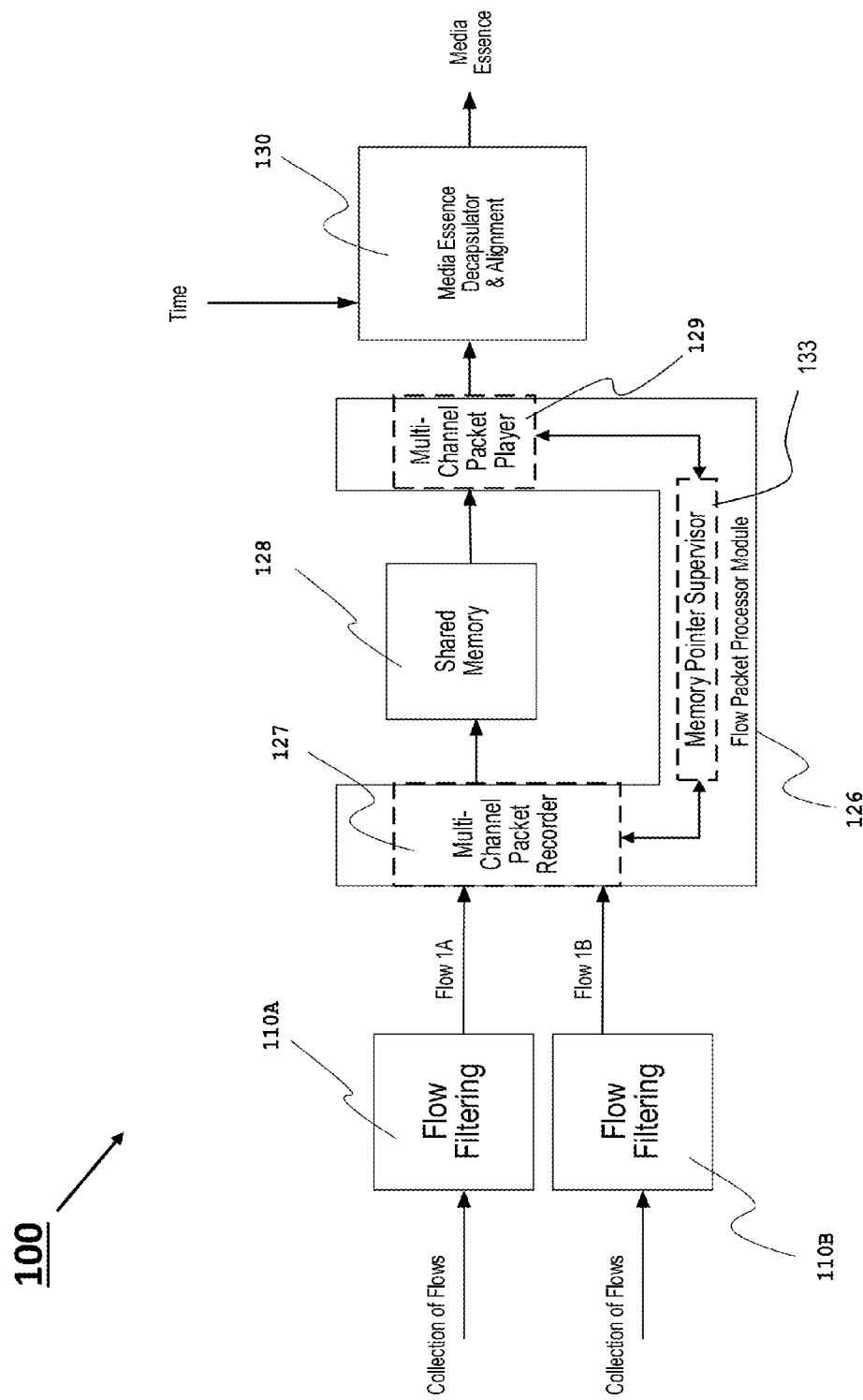
FIG. 2A illustrates a block diagram of a receiver providing scalable physical layer flow of packetized media streams in accordance with an exemplary embodiment.

FIG. 2A illustrates a block diagram of a receiver 100 providing scalable physical layer flow of packetized media streams in accordance with an exemplary embodiment. As shown, the receiver 100 includes a pair of flow filtering stages 110A and 110B, a flow packet processor module 126 and a media essence decapsulator and alignment module 130. In the exemplary embodiment, each flow filtering stage 110A and 110B is configured to receive and filter one or a plurality (i.e., a "collection") of data flows. Examples of the flow filtering stages 110A and 110B will described in an exemplary embodiment below with respect to FIG. 2B. However, in general, the data flows received by each flow filtering stage 110A and 110B can be redundant packetized media streams, using the SMPTE 2202-7 protocol, for example. In another exemplary aspect, the data flows received by each flow filtering stage 110A and 110B can be one or a plurality of non-redundant data streams.

After passing through the flow filtering stages 110A and 110B, the data flows are fed to a multi-channel packet recorder 127, which is a component of the flow packet processor 126. Thus, as shown, data flow 1A is output from flow filtering stage 110A and data flow 1B is output from flow filtering stage 110B. As will be described in detail below, the multi-channel packet recorder 127 can include a plurality of logical receive channel (i.e., one for each incoming data flow, for example). For example, two redundant data flows (e.g., flow 1A and flow 1B) can be assigned to the same record channel in an exemplary aspect. Moreover, each data flow is assigned a flow ID value that is associated to a specific receiver channel and can be associated dynamically to any recorder channel, allowing seamlessly disengaging redundancy or changing the incoming flow of a player channel without glitches.

Moreover, according to the exemplary embodiment, each recorder channel can then be dynamically associated to a respective memory bank, one per player channel, in the shared memory 128. More particularly, shared memory 128 can be a dual port memory block, for example, with each recorder channel writing packets to an associated bank used by a given player channel. According to the exemplary aspect, the recorder channel maps each packet to a packet index in the associated channel memory bank based on the unique sequence number for each packet. Thus, flow 1A is mapped by channel 0 to memory 128 starting at packet index 0 of bank packet buffer player 0, packet index 1, packet index 2, and so forth, up to packet M of data flow 1. In the redundant mode, the data flows 1A and 1B will be mapped to the same memory bank. In contrast, in non-redundant mode, the second data flow will be mapped to a second memory bank and so forth.

As further shown, the flow packet processor includes multi-channel packet player 129, which is communicatively coupled to the packet recorder 127 by memory pointer supervisor 133 and is configured to pre-fetch packets from shared memory 128, so that the packet player 129 is ready when media essence decapsulator and alignment module 130 requests one or multiple packets for playout. Thus, according to the exemplary embodiment, the multi-channel packet recorder 127 is configured to provide control signals that can include sequence numbers, packet indexes, and the like, to memory pointer supervisor 133. In turn memory pointer supervisor 133 is configured to control the recording of packets to shared memory 128 by multi-channel packet recorder 127, and to facilitate the fetching of data flows and associated packets by packet player 129 by providing data packet fetching control instructions that include the sequence numbers, packet indexes, etc., according the specific data flow. The details of the exemplary embodiment will become more apparent from the detailed description discussed below.

Figure 2B:
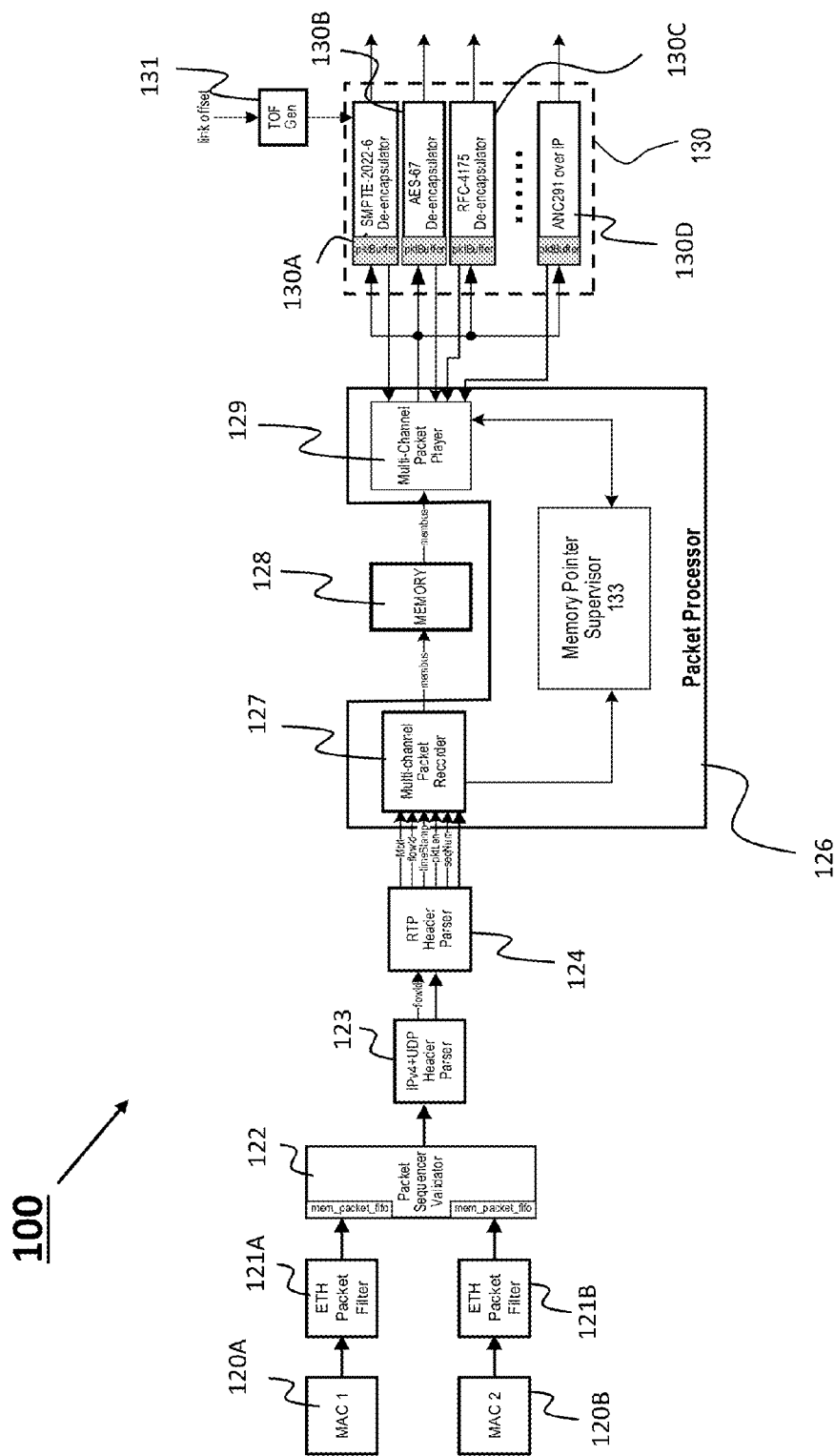
FIG. 2B illustrates a block diagram of a refinement of the exemplary receiver for providing scalable physical layer flow of packetized media streams in accordance with an exemplary embodiment.

Specifically, FIG. 2B illustrates a block diagram of a refinement of the exemplary receiver 100 for providing scalable physical layer flow of packetized media streams in accordance with an exemplary embodiment. It should be appreciated that FIG. 2B is a more detailed block diagram in a specific refinement of the exemplary embodiment of receiver 100. Thus, comment reference numbers are used to describe the component features shown in each figure. Moreover, the flow filtering stages 110A and 110B can be considered to include MAC ports 120A and 120B, packet filters 121A and 121B, packet sequencer validator 122, IP (e.g., IPv4) and UDP header parser 123, and RTP header parser 124, according to an exemplary embodiment.

More particularly, as shown, the receiver device 100 includes a pair of Ethernet MAC ports 120A and 120B that are each configured to receive a media stream from a network or a plurality of networks, as would be understood to one skilled in the art. It should be appreciated that while only two physical ports 120A and 120B are shown, the disclosed receiver 100 is in no way limited to only two ports and the concept is extensible to more than that, limited only by memory access and FPGA speed.

In the exemplary aspect, the Ethernet MAC ports 120A and 120B of receiver 100 can receive redundant data flows using the SMPTE 2202-7 protocol discussed above. It is noted that the terms data flow and media stream are used interchangeably herein. After each data flow is received by the Ethernet MAC ports 120A and 120B, respectively, the data flows are input to respective Ethernet packet filters 121A and 121B. In general, the packet filters 121A and 121B are provided to filter and remove the Ethernet headers from the data packets. Examples of packet filtering would be to pass only a given VLAN identifier, for example.

In any event, after the data flows pass through packet filters 121A and 121B, the data flows are input to a packet sequencer validator 122. As shown, the packets are output from packet filters 121A and 121B and input to packet sequencer validator 122 into a 1-packet FIFO ("first-in first-out") to allow the sequencer validator 122 to multiplex packets from both interfaces in a time-division multiplex manner. As such, its output needs to be capable of handling the sum of the bandwidths of all interfaces. The packet sequencer validator 122 is configured to validate the data packets by checking the CRC checksum of each data packet and blocking packets with CRC errors. Thus, only packets with valid CRC checksums are output by the packet sequencer validator 122.

At this stage, the packet sequencer validator 122 outputs the validated packets to an IP (e.g., IPv4) and UDP header parser 123, which further filters the data packets based on its headers as understood to one skilled in the art. A flow Id is assigned based on information from the headers that uniquely identify each flow on the network, like its source and destination IP address, for example.

The data is then passed to a RTP header parser 124. As is known to those skilled in the art, the data packets will include an RTP packet header with a 32-bit synchronization time stamp (i.e., a "RTP time stamp") and a 16 bit sequence number; essentially a datagram counter. The RTP header parser 124 is configured to parse the header information to extract the time stamps, sequence number, and marker bit for later use. It is noted that the time stamp of the RTP datagram provides a true time position. Thus, this time stamp value can be set in accordance with SMPTE 2059-1 and -2 as well as SMPTE 2110 standards, for example. The packet processor 126 can be used to align the sequence numbers and time stamp value of the two different streams, or flows, to match just those, as opposed to the entire RTP header as will be described in greater detail below.

The packet processor 126 includes a multi-channel packet recorder 127, shared memory 128 and a multichannel packet player 129. The shared memory is coupled to each of the packet recorder 127 and packet player 129 by respective memory busses and preferably sustains the sum of the bandwidth of all ETH interfaces connected, for example, a bandwidth of 40 Gbps according to an exemplary embodiment. Together, they provide multiple logical receiver channels offering multiple media processing stages using a single memory as discussed in detail below. As described above and further shown, the memory pointer supervisor 133 monitors memory write and read pointers of the packet recorder 127 and player 129 to detect underflow, overflow, and provide the current buffer level to the player 129 for each receiver logical channel. Advantageously, the disclosed receiver 100 uses logical receiver channels (one per flow Id redundant pairs) with multiple virtual address pointers to the memory 128. As such, a single memory can support a larger number of data flows, in order to offer a combination of flows, packet buffering, redundancy, video vertical switching and frame synchronization for example, without leaving the packet domain, to minimize hardware requirement, which saves costs, power, and FPGA resources which is critical for as would be appreciated to one skilled in the art.

Figure 2C:
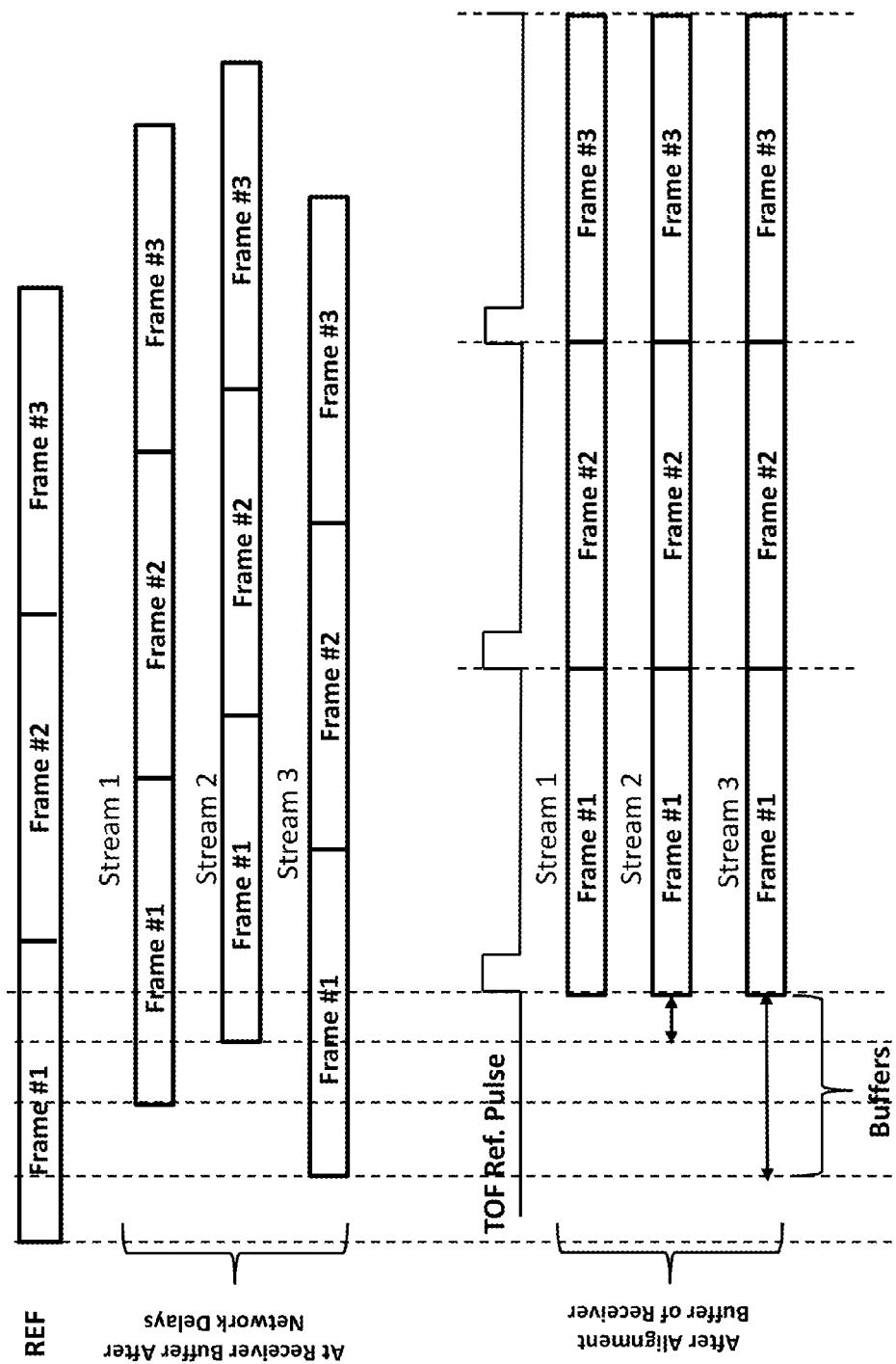
FIG. 2C illustrates a timing diagram aligning video media streams to a video reference using a TOF indication in accordance with an exemplary embodiment.

In general the packet processor 126 combined with the shared memory 128 provides data buffers to facilitate packet re-ordering, redundancy, timing domain transition and alignment of the RTP data flows before playout. For example, FIG. 2C illustrates a timing diagram aligning video media streams to a common video reference (like "black burst") using a TOF ("top of Frame") indication. As shown, a number of streams (shown as three streams) each having a plurality of frames (e.g., frames #1 through #3) can be received by network ports of receivers, such as the Ethernet MAC ports 120A and 120B of receiver 100, encapsulated as ST2022-6 for example. Due to different network paths, the data packets for each stream will often be delayed, causing variations when each stream is received. Thus, stream 3 may be received before either of streams 1 and 2 and all will be offset from one another and from the initial video reference. As shown, stream 3 will have an offset from the common video reference and the buffer necessary to align depends on the relative position of the TOF pulse (used as alignment point) as depicted.

Accordingly, one can use the single shared receiver buffer to also provide video alignment up to the pixel precision. This alignment is achieved by controlling the moment when the packet player 129 reads packets from the buffer, and this moment is controlled by the TOF provided to the de-encapsulators 120. We use a TOF over RTP time stamps due to the imprecision of the time stamps in some encapsulation protocol but also due to its simplicity of implementation. As shown in FIG. 2C, the buffer size necessary will be the difference between the moment packets are written to memory by the recorder 127 (i.e. when packets arrive) and the moment it is read by the player 129, paced by the TOF pulse. When the TOF is positioned far enough as too allow sufficient buffer, it also provides enough room to absorb packet delay variations and align flows for redundancy, as further discussed below.

Now, referring back to FIG. 2B, the packet recorder 127 stores the filtered media streams as they arrive into the memory 128 before playout. In the process, packets are re-ordered as the RTP sequence numbers are used for memory addresses. The memory 128 is split into multiple banks, one per logical receiver to store a redundant pair. Since redundant media streams have the same RTP sequence numbers as their corresponding primary media streams, they are mapped to the same memory location as explained later. The packet player 129 is communicatively coupled to the packet recorder 127, via memory pointer supervisor 133, and configured to pre-fetch packets from memory, so that the packet player 129 is ready when the media and essence decapsulators 130 request one or more packets. In the exemplary aspect, the de-encapsulators 130A-130D each include an output fed back to packet player 129 that provides a flow control signal to allow the packet player 129 to playback at a set media rate. Otherwise, the packet player 129 has no pacing time reference and would playback bursts of packets. As noted above, the receiver 100 includes a TOF generator 131 provided to every video media de-encapsulators (e.g., de-encapsulators 130A and 130C) for alignment purposes. The de-encapsulators 130A-130D are paced by their corresponding media clock generated either from the flows themselves by means of clock recovery or by some external common reference, like PTP for example.

According to the exemplary embodiment, the packet player 129 is exclusively paced by the de-encapsulators 130A-130D. Thus, the packet player 129 can be viewed as a slave. The packet player 129 can only output packets if the specific de-encapsulator 130A-130D allows it through flow control as described above. The de-encapsulators 130A-130D allows packets to be pushed by the packet player 129 based on RTP time stamps, channel buffer level provided by memory pointer supervisor 133, or TOF pulse position and media rate depending on the operating mode selected. The packet player 129 services all de-encapsulators 130A-130D, for example, in a round-robin fashion based on whether they requested packets. Under normal operation, the total bandwidth of all media streams matches the average sum of the de-encapsulators 130A-130D consumption rates. As a result, the packet player 129 is able, on average, to sustain the consumption rate of all de-encapsulators attached to it. Due to the time necessary to service all de-encapsulators however, a very small packet buffer is necessary in each de-encapsulator to prevent momentary starvation of data.

Moreover, de-encapsulators 120A-130D may operate in different modes depending on the media stream nature. For example, AES-67 media streams are aligned to time stamps derived from PTP. The de-encapsulator 130B requests one packet from the player 129 and compares its time stamp with local PTP time in order to allow more packets to be played out. In such case, the logical receiver buffer average level is entirely dictated by the offset added to time stamps (referred to as link offset in AES-67) to allow proper playback. Another example is the SMPTE-2022-6 de-encapsulator 130A when alignment to TOF as discussed above is necessary. The average buffer level then depends on the relationship to video reference and the position of the TOF as depicted in FIG. 2C. Additionally, the SMPTE-2022-6 may be use in an asynchronous mode where no TOF is in effect. In such case, the packet player 129 can be configured to wait until a certain number of packets are in the shared memory 128 before starting to read the packets, hence providing the minimum buffering necessary to absorb packet delay variations.

Figure 2D:
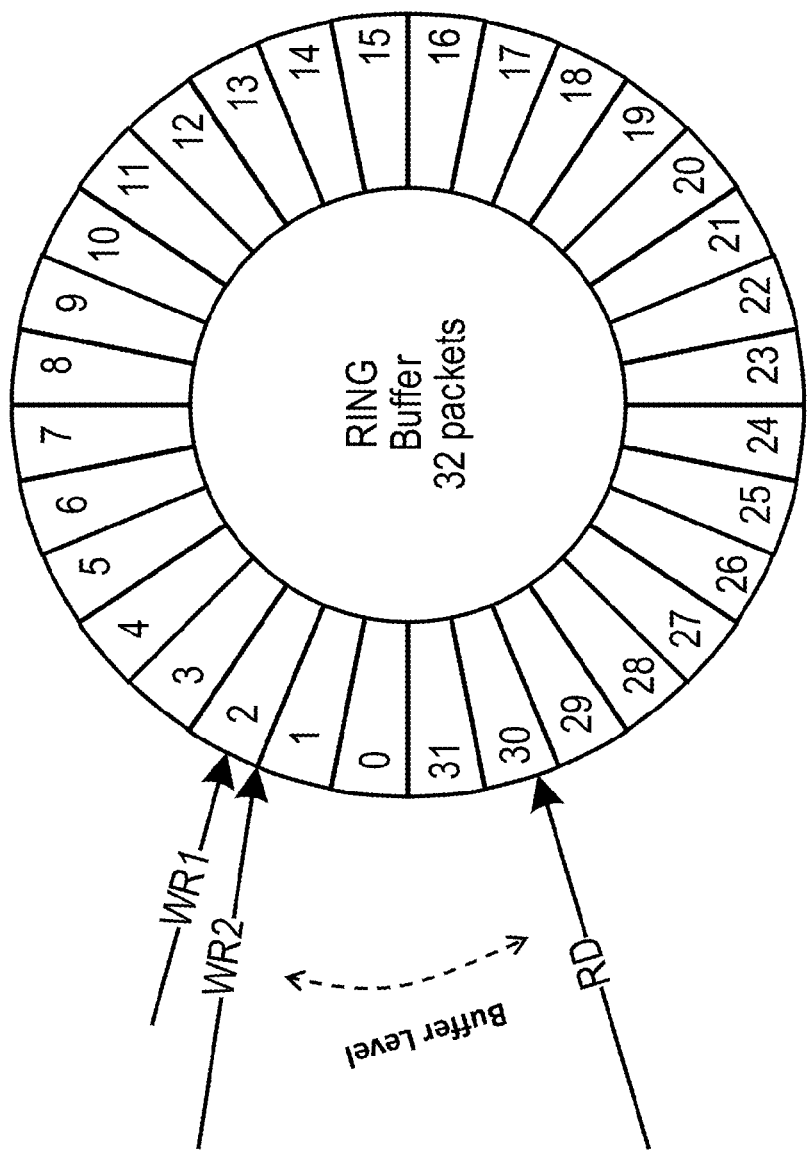
FIG. 2D illustrates a diagram of a memory buffer of the receiver for providing scalable physical layer flow of packetized media streams in accordance with an exemplary embodiment.

FIG. 2D illustrates a diagram of a memory buffer of the logical receiver channel for providing scalable physical layer flow of packetized media streams in accordance with an exemplary embodiment. A first-in first-out ("FIFO") is constructed for each logical receiver channel using the memory 128 and the packet processor 126. As shown, the data buffer is a ring buffer for storing 32 packets, for example, of the received data flows. In general, ring buffers are data structures that use a single, fixed-size buffer as if it were connected end-to-end, lending itself easily to buffering data streams. Moreover, in the example shown, the receiver is operating in redundant mode with two "virtual" write pointers as described later. In the exemplary embodiment, it is critical that the pointers do not pass each other so that the read pointer is always behind the two write pointers. This operation is achieved by the memory pointer supervisor 133 connected to the recorder 127 and the player 129 as described herein. As shown, a buffer level is set between the write pointers WR1 and WR2 and the read pointer RD so that the read pointer RD does not pass either write pointer WR1 and WR2.

Figure 3A:
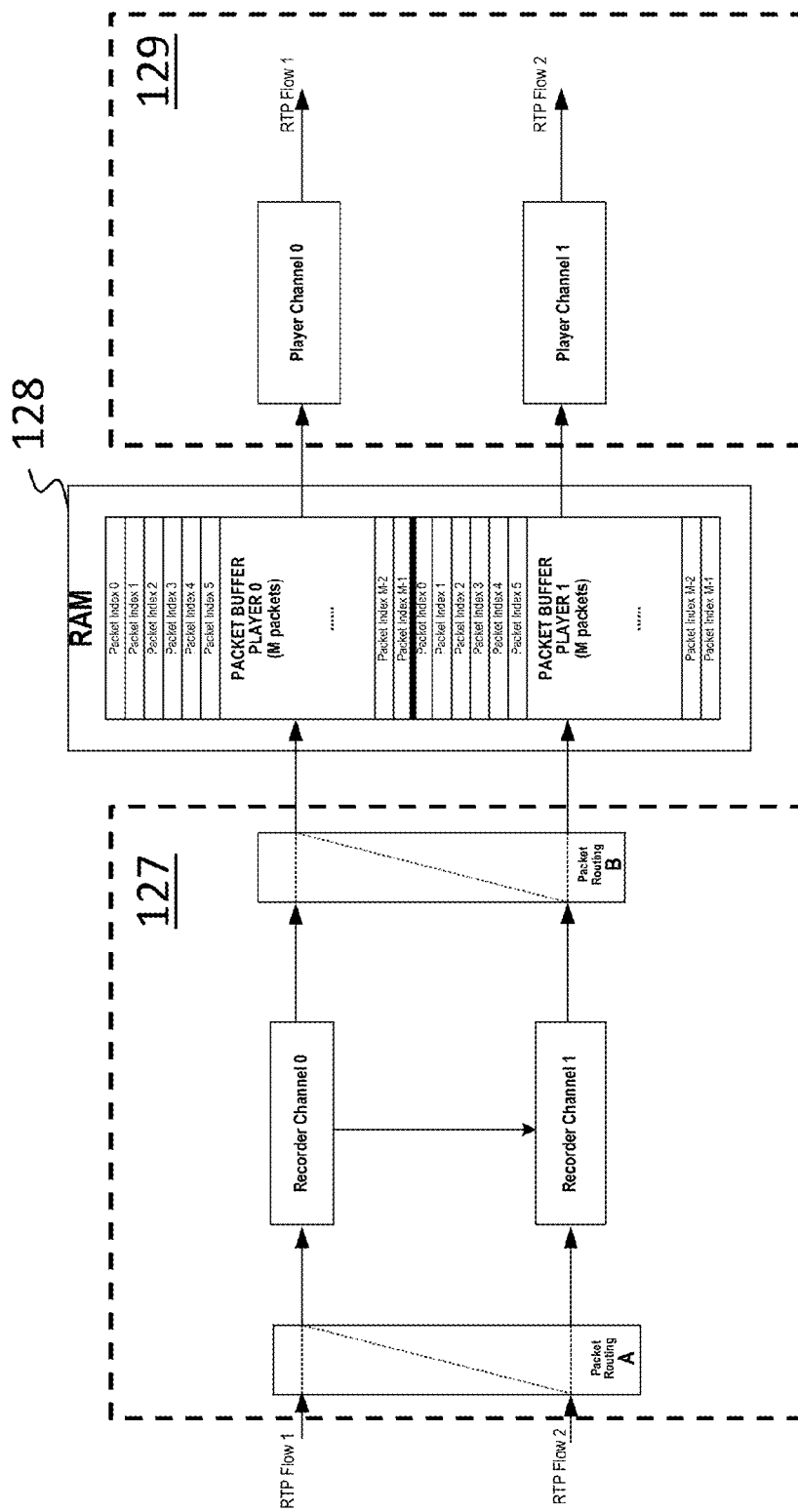
FIG. 3A illustrates a high-level conception diagram of the packet processing for providing scalable physical layer flow of packetized media streams in accordance with an exemplary embodiment.

FIG. 3A illustrates the conceptual block diagram of two logical receiver channels (i.e., recorder channels 0 and 1) implemented by the packet processor 126 for providing scalable physical layer flow of packetized media streams in accordance with an exemplary embodiment. In general, each RTP flow is assigned to a logical receiver channel. Two redundant RTP flows are assigned to the same recorder channel. For example, it is considered that RTP flow 1 (from Ethernet MAC port 120A) is received on a first recorder channel 0 and RTP flow 2 (from Ethernet MAC port 120B) is received on the same recorder channel. Each data flow is assigned a flow ID value (by the IPv4 header parser 123) that is associated to a specific receiver channel. Any flow ID can be associated dynamically to any recorder channel, allowing seamlessly disengaging redundancy or changing the incoming flow of a player channel without glitches. This is a key component to switching video in the packet domain and is explained herein. Each recorder channel can then be dynamically associated to any memory bank, one per player channel. A player channel is statically associated to a specific de-encapsulator 130A-130D. It results that each recorder channel can be dynamically associated to a specific de-encapsulator module.

Each flow is stored in buffer 128, which can be a dual port memory block (e.g., RAM) according to the exemplary embodiment or larger types of memory like DDR. In particular, each recorder channel writes packets to an associated bank used by a given player channel. The channel bank is further divided into packet banks big enough to contain the maximum packet size. Since most media stream has constant packet sizes, no memory is wasted and the channel packet size is adjusted accordingly. Each packet bank is designated by a unique packet index from 0 to M. The recorder channel maps each packet to a packet index in the associated channel memory bank based on the unique sequence number "seqNum" for that packet. Thus, flow 1 is mapped by channel 0 to memory 128 starting at packet index 0 of bank packet buffer player 0, packet index 1, packet index 2, and so forth, up to packet M of data flow 1. In general, when data flow 1 is received, the recorder channel always maps the first received data packet to packet index 0 which is where the player channel 0 starts to read. Similarly, in non-redundant mode, flow 2 is mapped by channel 1 to memory 128 starting at packet index 0 of bank packet buffer player 1, packet index 1, packet index 2, and so forth, up to packet M of data flow 2. In this example, player channel 0 takes care of playing out packets from index 0 to M in the order of flow 1 while player channel 1 plays out flow 2.

Figure 3B:
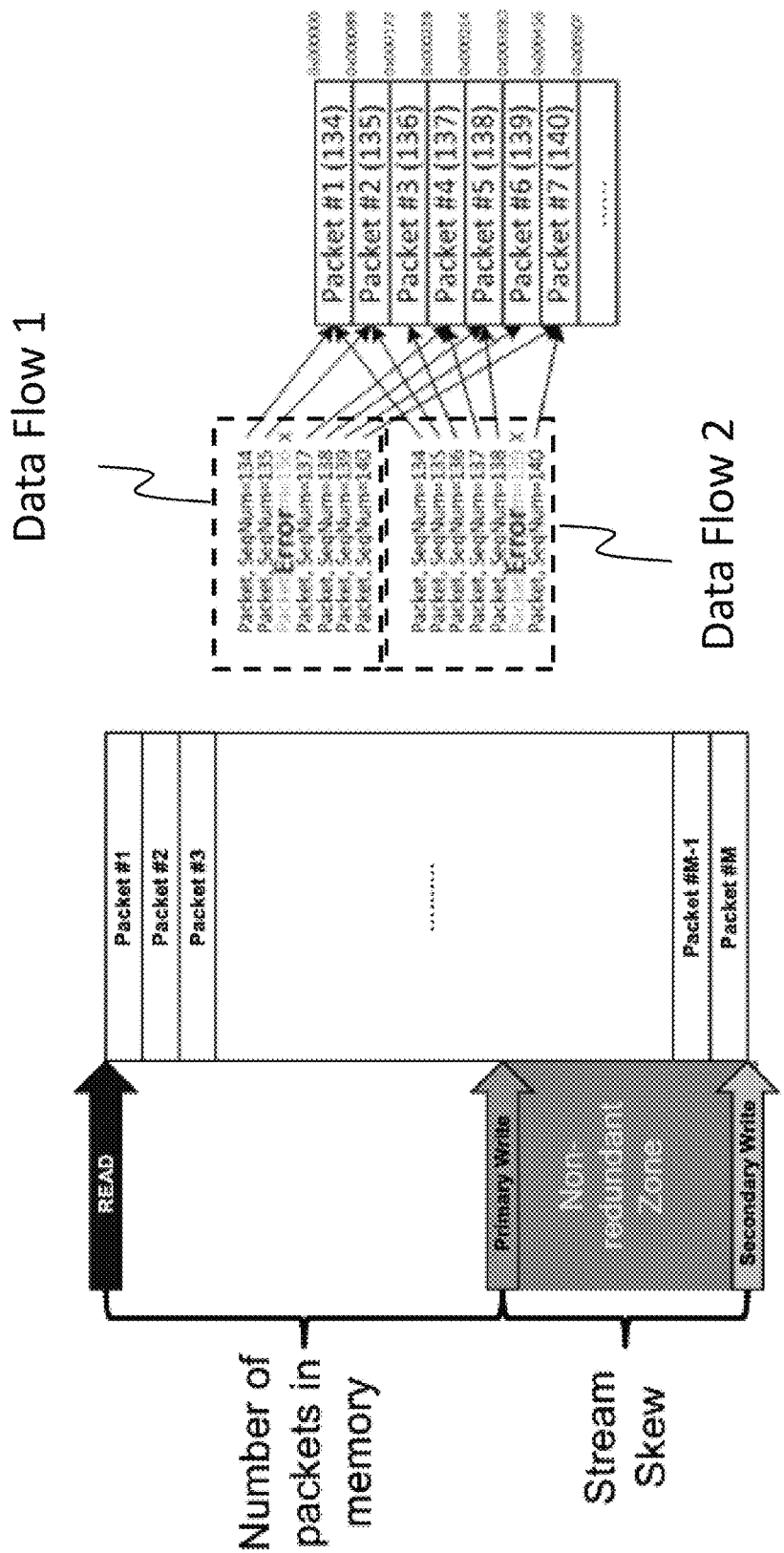
FIG. 3B illustrates a flow diagram for handling redundancy using a single, shared receiving buffer in accordance with an exemplary embodiment.

Furthermore, the use of logical receiver channels and the possibility to dynamically associate flows to each is the key element to both packet level redundancy and video switching between frames. For example, in FIG. 3A, the packet processor 126 can associate flow 2 to recorder channel 0, the same as flow 1. In such case, recorder channel 0 maps packets of both flows using the same mapping function. As a result, all packets with the same sequence number (hence identical packets) are mapped to the same packet index as depicted in FIG. 3B. Since packets are being written by 2 sources, in the event of error or lost packets on flow 1 or flow 2, this mechanism provides a reconstructed flow. When the player channel 0 plays the packets, it sees no lost packets as it reads packets contributed by both flow 1 and flow 2.

Moreover, two recorder channels can be used with a single player channel to create a vertical accurate switch between two unrelated, but synchronous video media stream. In this example, flow 1 and flow 2 are different with possibly much different sequence numbers. Each recorder channel has the ability to start writing to memory after a specified number of packets after the packet with the RTP marker bit (which indicates the end of a video frame) is seen, or to stop writing to memory after a given number of packets after the packet with the RTP marker bit is seen. Initially, flow 1 and flow 2 are associated to recorder channel 0 and 1 respectively. Then, the control entity in the system requests that recorder channel 0 stops a certain number of packets after the marker bit is seen on flow 1, and that recorder channel 1 starts that same number of packets after the marker bit is seen on flow 2. Recorder channel 0 computes the theoretical packet index of the next marker bit (known from the media format) and shares this position with recorder channel 1. Recorder channel 1 will map the next packet of flow 2 with the marker bit to this exact same location in memory but will skip writing until the next. The result is flow 1 being written to memory until specified packet is seen, and flow 2 starting to be written exactly where flow 1 would have written the next packet. The player channel 0 on the other side sees no discontinuation of data provided flow 1 and flow 2 are of the same type. The ability to switch at an arbitrary number of packets after the marker bit allows switching ST2022-6 flows as per RP-168 standard, that is on the switch video line. This target packet can be computed easily by knowing how many pixels are in one packet.

In the non-redundant example, player channel 0 receives the output from memory 128 of data flow 1 and player channel 1 receives the output from memory 128 of data flow 2. Thus, in this embodiment, each packet player channel starts readout as soon as packets are available in its buffer and keeps reading the packets as long as they are present, paced by the de-encapsulators as described earlier. In the event of lost packets, no packets are written at the packet index location in memory and therefore whatever was written there at an earlier time is seen by the player channel. This packet index location contains a valid packet written earlier and therefore contains a sequence number that is unrelated with the previous packet. The packet player channel will analyze the sequence number of each packet and, if not contiguous with respect to the previous, will generate a "lost packet" message to the de-encapsulator which is responsible to perform error concealment when possible.

For example, the SMPTE-2022-6 de-encapsulator 130A could generate black pixels to account for the lost packets. In one embodiment, the player channel may also perform error concealment itself by reading out a packet equivalent to the lost one from a previous video frame for example, provided it is available in memory 128.

It should be appreciated that FIG. 3A shows packet routing in the exemplary embodiment. Advantageously, the packet processor 126 can use RTP data flows 1 and 2 as independent flows or as redundant flows by simply associating flows to different or the same recorder channel. This is not limited to 2 flows. Provided there are multiple flows arriving at the recorder 127, it is possible to make any flow redundant to any other, or even make multiple flows redundant to another. Moreover, since any recorder channel can be associated to any player channel dynamically, it is possible to re-route dynamically any flow to any de-encapsulator, effectively providing a built-in routing capability with no additional logic. This allows a significant savings in FPGA logic when a video cross-point is necessary in the application.

FIG. 3B illustrates a packet index mapping of the processing of the packet recorder 127 of the exemplary receiver for providing scalable physical layer flow of packetized media streams in accordance with an exemplary embodiment. In one aspect, the packet recorder (e.g., multi-channel packet recorder 127) makes use of the 16-bit sequence number found in the RTP header, extracted by RTP header parser 124, to organize the packets into memory. As explained above and shown, the shared memory 128 is divided into packet banks having a fixed size that is large enough to accommodate a maximum size for a packet of each data flow.

Thus, the first packet of a first data flow (e.g., RTP flow 1) can be stored by packet recorder 127 in the shared memory 128 as Packet #1 at packet index 0 (first packet always mapped to 0) using the sequence number 134 in this example. It follows that Packet #2, Packet #3 and so forth up to Packet #M, are mapped to packet indexes 1, 2, 3 up to M, for example. As further noted, the mapping function will map every sequence number linearly to a unique "packet index" in the memory as shown. This process allows packet reordering to take place and this is how mis-ordered packets are re-ordered in memory. Similarly, a second flow (e.g., RTP flow 2), which is a redundant media stream in this example, will see its packet with sequence number 134 mapped to packet index 0 as well. Identical packets coming from the 2 flows are hence written to the same memory location, for example.

It should be appreciated that if a packet is in error (for example packet #3 of flow 1), using a CRC check for example as discussed above, or even missing, it is never written to memory 128. The assumption is that the other flow source will have the packet and write it to the memory 128. The result is a reconstructed, ordered flow of RTP packet payloads as shown, e.g., Packet #1 (134), Packet #2 (135), Packet #3 (136) . . . Packet #7 (140) and so forth. As a result, the receiver uses a single shared memory (i.e., dual port memory 128) for both the first RTP data flow 1 (e.g., a primary multicast media stream) and the second RTP data flow 2 (e.g., a redundant multicast stream).

Because both streams are stored in a shared buffer, the reader (i.e., packet player channel) must take into account two "virtual" write pointers, and anyone of them may stop advancing if the stream is lost completely. The pointers are said "virtual" because in reality packets are written to memory by the recorder channel one after the other sequentially. In reality, there is a single write pointer per recorder channel that "jumps" back and forth to write packets from both flows. In essence though, the number of redundant packets that are in the memory is the difference between the latest writer and the reader. The difference between the two "virtual" write pointers is equivalent to the skew between the streams. For example, we may receive flow 1 packet number 15 and right after receive flow 2 packet number 25 due to an unequal delay of the two network paths. Then the first "virtual" write pointer would point at packet index 12, for example, and the second would point much farther to packet index 12+(25−15)=22. Although reading the packets could start almost right away, the redundancy is really only available after a time equivalent to the skew between the streams as should be understood to one skilled in the art.

Moreover, as mentioned above, if one of the flows completely goes away, its "virtual" pointer disappears completely and the write pointer stops "jumping". This does not create any problem for the player read pointer as it is normally far behind. The buffer simply appears as if it suddenly contained more/less packets. Ultimately, when the flow comes back, its sequence numbers with respect to the other flow will cause the "virtual" write pointer to land with the exact same prior relationship (provided the skew is the same) which guarantees that everything is redundant again.

Figure 4A:
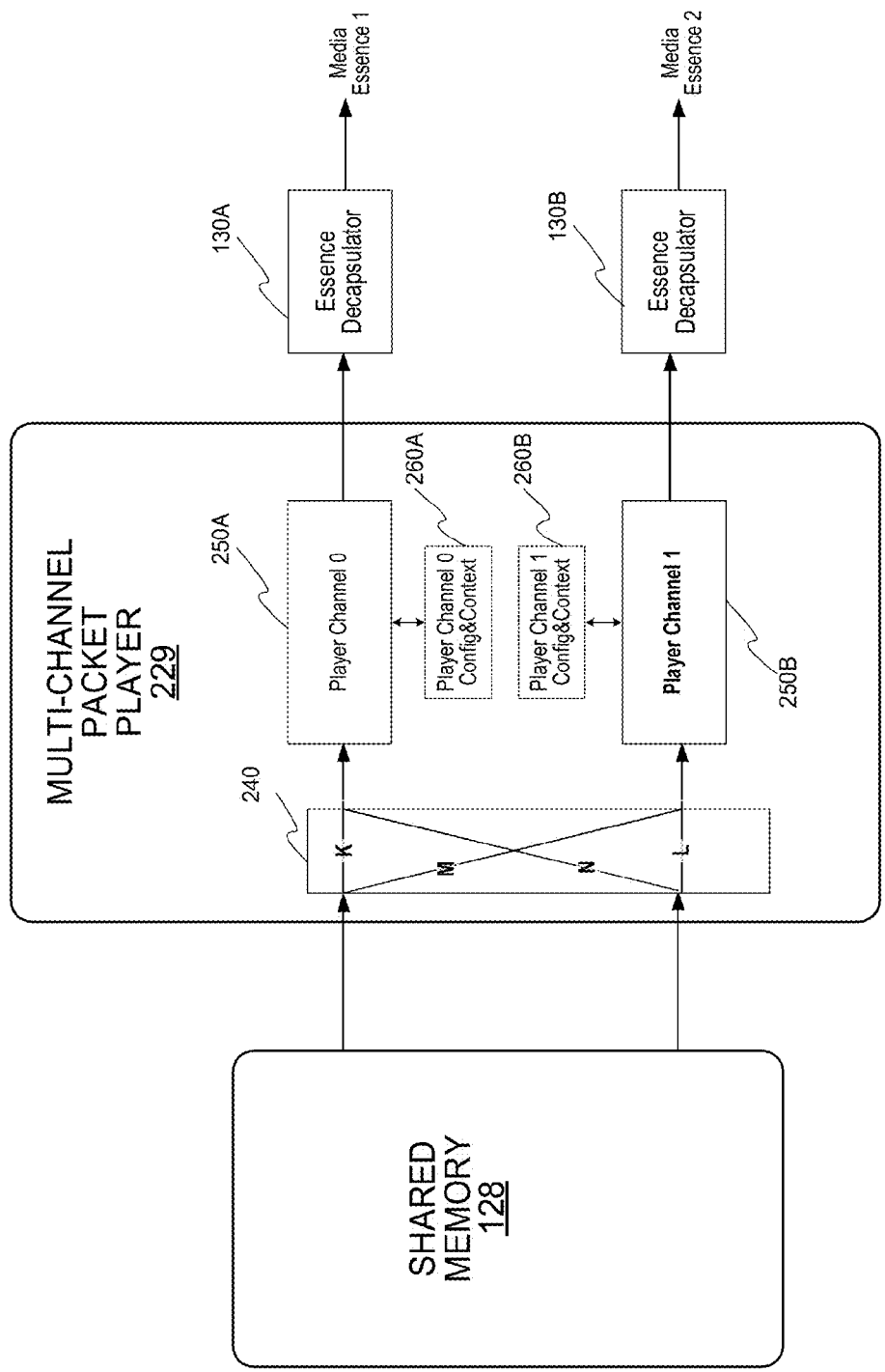
FIG. 4A illustrates a block diagram of a refinement of the exemplary multi-channel packet player in accordance with an exemplary embodiment.

FIG. 4A illustrates a block diagram of a refinement of the exemplary multi-channel packet player in accordance with an exemplary embodiment. As generally shown, the multi-channel packet player 229 is coupled to shared memory 228, such that multiple packet players (e.g., player channels 0 and 1) can read data packets from the same shared memory 128. In the exemplary embodiment, two essence decapsulators 130A and 130B are shown as being coupled to the multi-channel packet player 229 to be fed respective data flows. It is noted that in general, the term "essence" refers to video and/or audio data (i.e., packetized data streams or flows) as described above.

According to the exemplary embodiment, the multi-channel packet player 229 includes a pair of players 250A and 250B and associated player channel configuration context information 260A and 260B that can be provided by memory pointer supervisor 133 and can include, for example, memory offsets of each memory bank in shared memory 128 and the size of each packet bank. Furthermore, the multi-channel packet player 229 includes a data flow selector 240 coupled between the shared memory 128 and the player channels 250A and 250B. The data flow selector is configured to fetch each data flow stored in each separate memory bank of shared memory 128 and direct the data flow to each player channel 250A and 250B. Advantageously, if each essence decapsulators 130A and 130B wants to simultaneously output the same media (i.e., media essence 1 and 2 are set to the be the same), the data flow selector 240 can fetch a single data flow from the same memory bank of shared memory 128 and feed this data flow to both player channel 250A and 250B simultaneously, for example. As a result, the two separate essence decapsulators 130A and 130B can payout the same exact packetized media stream simultaneously without the packet recorder needing to create/store a separate copy of the media stream in separate memory.

Figure 4B:
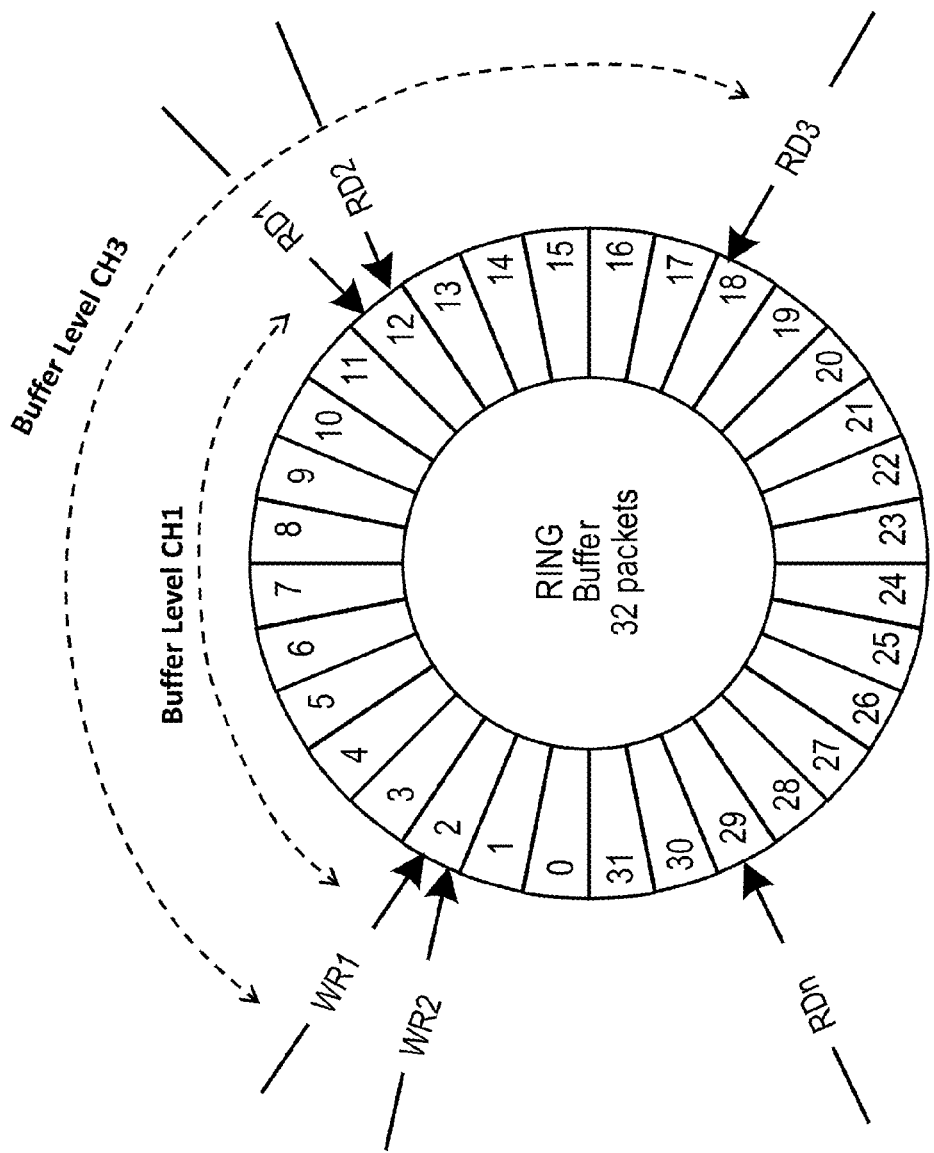
FIG. 4B illustrates a diagram of a memory buffer of the receiver for providing scalable physical layer flow of packetized media streams using multiple memory points according to the exemplary embodiment shown in FIG. 4A.

FIG. 4B illustrates a diagram of a memory buffer of the receiver for providing scalable physical layer flow of packetized media streams using the multi-channel packet player shown in FIG. 4A. Similar to the memory buffer described above with respect to FIG. 2D, a first-in first-out ("FIFO") is constructed for each logical receiver channel using the shared memory 128 and the packet processor 126. As shown, the data buffer is a ring buffer for storing 32 packets, for example, of the received data flows. In the example shown, the receiver is operating in redundant mode with two "virtual" write pointers WR1 and WR2 writing to the memory of the ring buffer as described herein to provide redundancy of the data flows. As also noted above, it is critical that the pointers do not pass each other so that the read pointer is always behind the two write pointers. In addition, according to the exemplary embodiment, the multi-channel packet player 229 includes the data flow selector 240 that is configured to fetch data packets from the data buffer. It should be appreciated that the multi-channel packet player 229 can perform a plurality of simultaneous read operations RD1 to RDn. For example, in one aspect, if the media outputs for two or more essence decapsulators (e.g., decapsulators 130A and 130B) is to be aligned (i.e., played out simultaneously), then read operations RD1 and RD2 will be performed on the same packet (e.g., packet #12) and then fed to the respective player channels. In another example, if the media streams are not to be aligned, the read operations can be performed on different packets in the ring buffer (e.g., RD1 of packet #12 and RD3 of packet #18). In any event, it should be appreciated that the ring buffer configuration provides for dynamically selection and playout of multiple aligned media streams without requiring an additional memory for each stream as would be appreciated to one skilled in the art.

Figure 5:
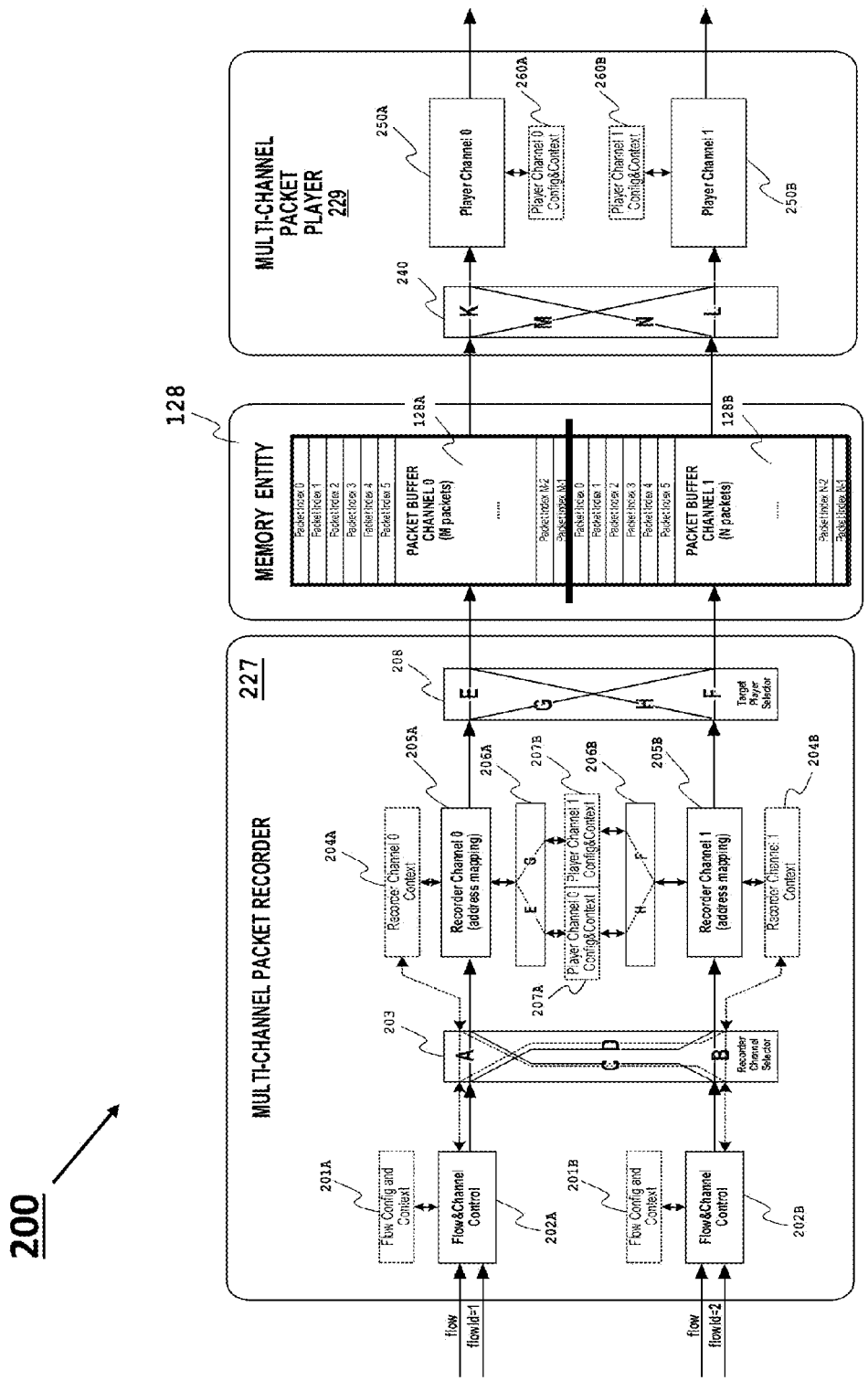
FIG. 5 illustrates a block diagram of a receiver for providing scalable physical layer flow of packetized media streams in accordance with another exemplary embodiment.

FIG. 5 illustrates a detailed block diagram of a receiver for providing scalable physical layer flow of packetized media streams in accordance with another exemplary embodiment. It should be appreciated that receiver 200 includes many of the same components and configurations described above with respect to the exemplary embodiments, including for example, shared memory 128 and multi-packet player 229. Thus, the details of the components will not be described in detail again. The receive 200 shown in FIG. 5 provides an exemplary configuration of the disclosed system.

According to the exemplary embodiment, the packet recorder 227 implements multiple channels by retrieving, updating, storing channel state variables for each flow ID. Moreover, each recorder channel implemented by packet recorder 227 provides the address mapping functionality as described above. Moreover, the packet mapping function is part of the state variables and can be different for each channel. The packet mapping is sufficient to offer re-ordering and reconstruction of redundant packets.

Moreover, similar to the embodiments described above, the packet recorder 227 can provide multiple individual flows, or combine any two flows to offer data redundancy, provided those flows are a copy of each other. This allows using the multiple Ethernet ports (e.g., Ethernet MAC ports A and B 120A and 120B described above) as flow contributors or to designate one or more as redundant ports dynamically. Moreover, as further described above, the shared memory 128 is divided into multiple channel banks, one for each redundant flow pairs with the memory location offset of each channel being specified by the channel state variables.

It should be appreciated that receiver 200 can be dynamically provided for any number of receivers, but is illustrated as being a two-channel receiver for clarity of the exemplary embodiment. Thus, as shown, receiver 200 is a conceptual detailed representation of two conceptual "parallel" channels of the packet recorder 227 and packet player 229.

Although the processing appears to be parallel, packets are effectively processed one after the other on alternate paths as described above.

According to the exemplary embodiment, the packet recorder 227 provides a flow control 202A and 202B for each incoming data flow based on control signals 201A and 201B. Accordingly, the control signals allows for the disabling, starting and stopping of the flow on specific packets within the flow. Thus, packets can be filtered until a specific packet is reach after which packets start to pass through. Alternatively, the control also allows packets to be filtered (i.e., disabling the flow) at a specific packet. This ability to start/stop recording of data flows to the shared memory 128 at specific packet location is used to provide packet domain video processing functions described below.

Moreover, according to the exemplary embodiment, flows can be dynamically assigned to any recorder channel (e.g., channels 205A and 205B) through the virtual channel selector 203. The selected recorder channels 205A and/or 205B behave as described above by mapping packets based on their RTP sequence numbers. Each recorder channel 205A and 205B is configured to use uses a channel context (e.g., channel context 204A and 204B, respectively) to store the packet bank (or packet index) and RTP sequence number of the last mapped packet on that channel. For example, given M packet banks, any packet n can then be mapped in the following way:

pktIndex[$n$]=(pktIndex[$n-1$]+seqNum[$n$]-seqNum[$n-1$]) MODULO $M$ pktIndex[0]=0 for all seqNum[0]

Moreover, each recorder channel 205A and 205B is assigned to a target player channel through target player selector 208 according to an exemplary embodiment. In this embodiment, each player channel 250A and 250B can be statically associated to a specific decapsulator (not shown), as described above. As a result, each recorder channel 205A and/or 205B can be routed to any decapsulator output. Moreover, each player channel 250A and 250B has a reserved channel memory bank 128A and 128B, respectively, from shared memory 128. It is noted that the data flow selector 240 is shown to be included in the packet player 229, but is not a required component of the receiver 500 and may be omitted according to an alternative embodiment.

Furthermore, the memory offset of each channel bank 128A and 128B and the size of each packet bank are stored in a respective player channel context 207A and 207B in the packet record 227. In that way, any recorder channel 205A and/or 205B can use the right target player channel context 207A and/or 207B to map packets to the right memory location, given packet n with target player i:

Address[$n$]=(pktIndex[$n$]×packetSize[$i$])+channelOffset[$i$]

Moreover, the player channels 250A and/or 250B can use a copy of the exact same context (e.g., context 260A and 260B) to derive the address. Accordingly to the exemplary embodiment, the player channels 250A and 250B always starts at index 0 for any given bank and read packets from each index one after the other upon request from the decapsulator, as further described above.

According to an exemplary embodiment, the exemplary receiver 200 can operate in a contributing flow mode in which two incoming data flows can be processed as completely independent flows regardless of which Ethernet port they came from. In this aspect, each flow is assigned its own recorder channel (e.g., recorder channel 205A and 205B based on control from recorder selector 203). Moreover, each recorder channel 205A and 205B can be assigned its own dedicated memory bank 128A and 128B based on target player selector 208 (i.e., paths E and F) and their respective player channels. In this operating mode, two independent decapsulator (described above) are used to provide two distinct media streams.

According to another exemplary embodiment, the exemplary receiver 200 can operate in a redundant flow mode in which the two incoming data flows can be "paired" to offer packet level redundancy provided they are identical at the RTP level, as described above. In this aspect, both flows are assigned to the same recorder channel 0 (i.e., recorder channel 205A) through the recorder channel selector 203 (i.e., paths A and C). Thus, using the same recorder channel 205A will result in mapping packets with the same RTP sequence number to the same memory location in shared memory 128, as also described above. In this embodiment, a single player channel (i.e., either of player channels 250A or 250B) and decapsulator can be assigned to provide a single reconstructed media stream.

According to yet another exemplary embodiment, the exemplary receiver 200 can provide packet delay variation removal in which incoming data packets will be written by the packet recorder 227 at the same pace they arrive. Since networks are non-deterministic in nature, packets will arrive with a varying delay, sometimes even in short bursts. While the packet recorder 229 writes packet in that same cadence, the packet player 229 can be configured to read packets at a rate set by the decapsulator(s) which is paced by a constant media clock as further described above. For example, the media clock may come from a clock recovered from the data flow itself or from a system-wide IEEE-1588 PTP clock according to variations of the exemplary embodiment.

According to yet another exemplary embodiment, the exemplary receiver 200 can provide alignment to RTP time in which incoming data flows are aligned to a common time reference, which is often required in many application such as to keep audio-video synchronized to avoid lip-sync. For example, SMPTE-2110 systems uses the RTP time stamps derived from the same IEEE-1588 PTP clock. In this aspect, the decapsulator "time" input would be PTP converted to RTP time. As such, the decapsulator can then decide to discard the packet when late, or "hold" until the right time has come to process the packet.

According to yet another exemplary embodiment, the exemplary receiver 200 can provide alignment to video alignment point. In this aspect, when the RTP flows carry uncompressed video information (e.g., SMPTE-2110), alignment to a common video alignment point such as SMPTE-2059 or a classic "black burst" is possible instead of using RTP time. Thus the receiver 200 can reuse the shared memory 128 to perform frame buffer processing and eliminate the need to add another expensive frame buffer later in the processing chain.

In this aspect, the one or more decapsulators are given the alignment point as "time" input instead of RTP time stamps. For example, both RFC-4175 and SMPTE-2022-6 video transport protocols make use of the RTP marker bit to indicate the last packet of a field or frame. This marker can be used in conjunction with the alignment point to align the start of a field/frame. On startup/reset, the flow control 202A and/or 202B seeks the marker bit on a given channel and discards all packets until the first packet of a frame/field is seen. At that time, packets are written to shared memory 128 starting at packet index 0 for that recorder channel. This effectively becomes a start-up condition where the start of a video frame is guaranteed to be at the top of the buffer.

Furthermore, the decapsulator start-up sequence waits on a TOF pulse generated from the video alignment point before requesting any packet to the player channel (e.g., channel 250A). Once that timing condition is met, the decapsulator requests the first packet to the packet player 229. The packet player 229 can then provide the first found packet in the shared memory 128 from packet index offset 0, which is the first packet of the video frame written by the packet recorder 227. As a result, the first pixels of the frame being output are aligned with the video alignment point provided. In this aspect, the media rate of the decapsulator is assumed to be the same as the flow rate. Moreover, phase adjustments are done by offsetting TOF pulse from the video alignment point.

According to yet another exemplary embodiment, the exemplary receiver 200 can provide video frame synching in the packet domain. For example, when the media rate of the data flow is not locked to a video reference, a mismatch between the rate of the packet recorder 227 and the packet player 229 can occur on that channel. After starting up, the number of packets in shared memory 128 will being to drift slowly and will either get bigger or smaller. In such conditions, the packet player 229 can be configured to perform frame synching by repeating packets from a previous frame or skipping a whole frame. By knowing the position of the marker bit packets in the shared memory 128, the packet player 129 will know where the frame boundary lie and can easily "replay" the data packets of a whole frame. Effectively, the decapsulator will see no difference (which is why RTP time stamps are not used for alignment in this example) and decapsulation will be performed as normal, as described above.

According to yet another exemplary embodiment, the exemplary receiver 200 can provide video vertically accurate switching in the packet domain. More particularly, switching video often requires that no glitch is seen on the monitor, for example, as described in detail in U.S. Patent Provisional Application No. 62/385,063, entitled "System and Method for Performing Lossless Switching in a Redundant Multicast Network", filed Sep. 8, 2016, the entire contents of which are hereby incorporated by reference. As described therein, the switch should be performed such that lost information is not critical. For example, the SMPTE RP-168 defines SDI raster positions where it is safe to switch. Moreover, since SMPTE-2022-6 is SDI, it is possible to mimic RP-168 switching by simply changing the flow ID being written to the shared memory 128 by the packet recorder 227 at a specific packet after the marker bit packet.

According to the exemplary embodiment, the packet recorder 227 can use the marker bit as reference and refers to it as packet #0. The RTP sequence number corresponding to that packet is used as reference. An offset is added to that sequence number to designate an RTP target packet where the switch will happened, taking into account potential sequence number wrap-around. The packet recorder 227 can manage the two recorder channels 205A and 205B to perform the switch and can do this even with redundancy enabled, effectively switching four flow IDs together. In this aspect, the first recorder channel 205A receives flow 1A/1B and the second recorder channel 205B receives the second flow 2A/2B. The recorder channel 205A is instructed to stop recording after the target packet is reached on data flow 1A/1B. Moreover, recorder channel 205B is instructed to start recording packets after the target packet is reached on flow 2A/2B. The recorder of channel 205A computes the memory location of the next target packet in advance and shares it with recorder channel 205B that will make sure to map the target packet to the same location in shared memory 128. The result is that recorder channel 205B starts writing data packets exactly where recorder channel 205A stops. Moreover, the decapsulator(s) does not see any discontinuity and the observed effect is a vertically accurate switch.

Figure 6:
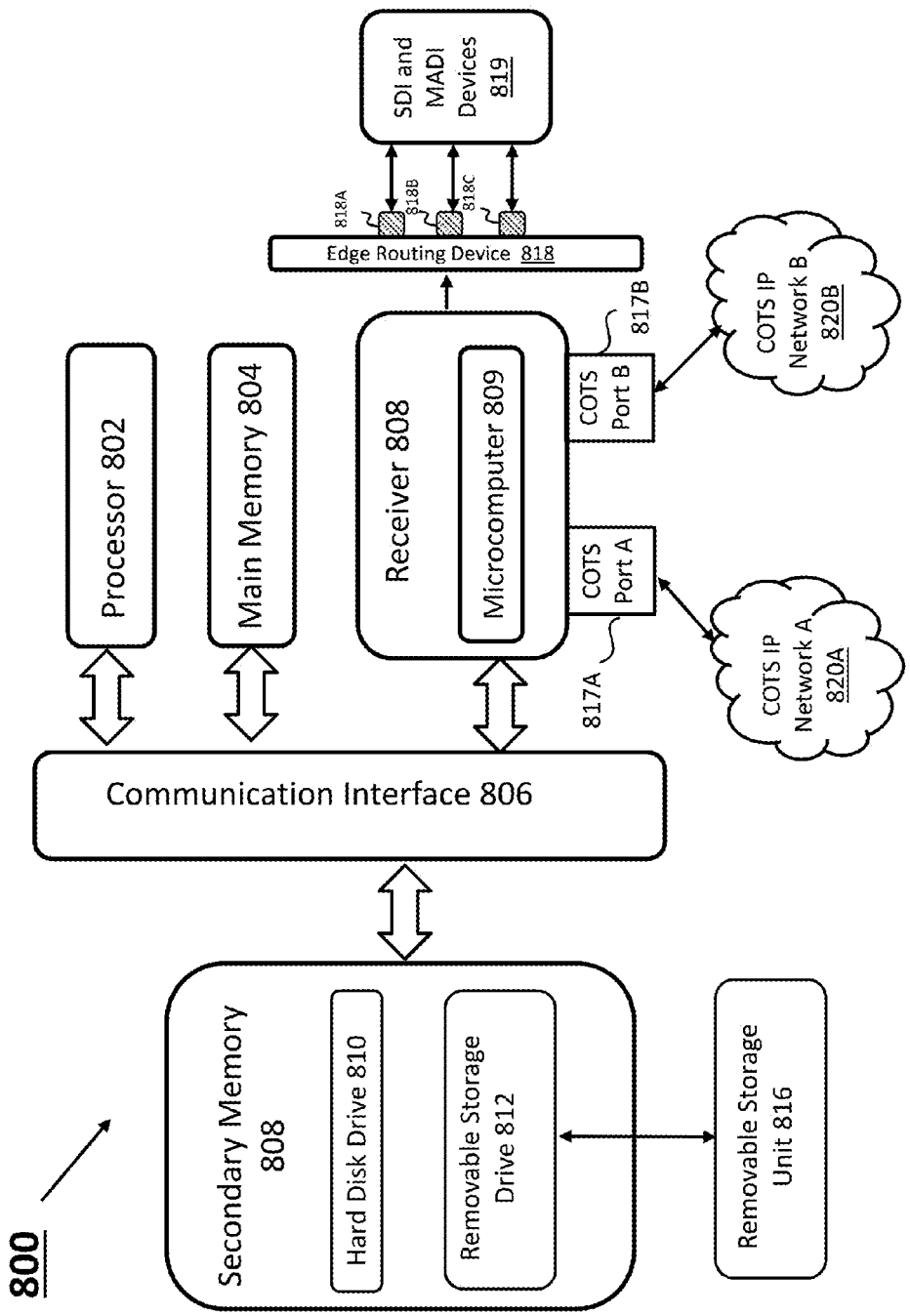
FIG. 6 illustrates a high-level block diagram of a system for providing scalable physical layer flow of packetized media streams in accordance with an exemplary embodiment.

FIG. 6 illustrates a high-level block diagram of a system for providing scalable physical layer flow of packetized media streams in accordance with an exemplary embodiment. As shown, the system 800 includes a receiving device 808 that can correspond to receiver 100 discussed above. In general, the components of the receiver that are described herein can be implemented as FPGA code, but can also be implemented through a combination of hardware and software components. In addition, as shown, the receiver 100 can include control circuitry, which can be microcomputer 809 for example. Microcomputer 809 can be a computer processing unit ("CPU"), a microprocessor, or the like, as known to those skilled in the art that is configured to control receiver 100 using the algorithms and operations shown above.

Moreover, the microcomputer 809 is configured to control the input to COTS ports A and B denoted by 817A and 817B. The COTS ("commercial off-the-shelf") ports A and B can correspond to the Ethernet MAC ports A and B 120A and 120B described above. As shown, each COTS port A and B has one or more outputs coupled to receiver 100. Moreover, the COTS ports A and B are communicatively coupled to COTS IP networks A and B (denoted by 820A and 820B) as would be understood to one skilled in the art. The receiver 808 includes an output coupled to an edge routing device 818 that can route the outputted multicast media stream to one or more SDI and MADI devices 819 by a plurality of input/output ports 818A, 818B and 818C. In one embodiment, the receiver 800 and edge routing device 818 are a single device.

In addition, FIG. 6 illustrates additional various hardware components and other features, for use in accordance with aspects presented herein. Aspects presented herein may be implemented using hardware, software, or a combination thereof and may be implemented in one or more computer systems or other processing systems. Thus, according to an exemplary embodiment, system 800 may also include one or more processors, such as processor 802, which can be separate to receiver 808 or, alternative, correspond to microcomputer 809 and be a component of receiver 808 or a standalone processor in one embodiment. In either event, the processor 802 (or microcomputer 809) is connected to a communication interface 806 (e.g., a communications bus, cross-over bar, or network). Various software implementations are described in terms of this example computer system.

By way of example, an element, or any portion of an element, or any combination of elements may be implemented with a "processing system" that includes one or more processors. The processing system further includes one or more modules for executing the algorithms described herein. The modules may be software modules running in the processor 802 and/or microcomputer 809, resident/stored in memory 808, e.g., a computer readable medium, one or more hardware modules coupled to the processor 802, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Computer system 800 also includes a main memory 804, preferably random access memory (RAM), and may also include a secondary memory 808. The secondary memory 808 may include, for example, a hard disk drive 810 and/or a removable storage drive 812, representing a floppy disk drive, a magnetic tape drive, an optical disk drive, etc. The removable storage drive 812 reads from and/or writes to a removable storage unit 816 in a well-known manner. Removable storage unit 816, represents a floppy disk, magnetic tape, optical disk, etc., which is read by and written to removable storage drive 812. As will be appreciated, the removable storage unit 816 includes a computer usable storage medium having stored therein computer software and/or data.

In alternative implementations, secondary memory 808 may include other similar devices for allowing computer programs or other instructions to be loaded into computer system 800. Examples of such may include a program cartridge and cartridge interface (such as that found in video game devices), a removable memory chip (such as an erasable programmable read only memory (EPROM), or programmable read only memory (PROM)) and associated socket, which allow software and data to be transferred from the removable storage unit 808 to computer system 800. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Computer programs (also referred to as computer control logic) are stored in main memory 804 and/or secondary memory 808. Such computer programs, when executed, enable the computer system 800 to perform the features of the aspects discussed herein. In particular, the computer programs, when executed, enable the processor 802 to perform the features of the presented herein. Accordingly, such computer programs represent controllers of the computer system 800.

If implemented in software, the functions may be stored on or encoded as one or more instructions or code on a computer-readable medium. Computer-readable media includes computer storage media. Thus, when aspects are the implemented using software, the software may be stored in a computer program product and loaded into computer system 800 using removable storage drive 812, or hard drive 810, for example. The control logic (software), when executed by the processor 802, causes the processor 802 to perform the functions as described herein. In another example implementation, aspects may be implemented primarily in hardware using, for example, hardware components, such as application specific integrated circuits (ASICs). Implementation of the hardware state machine so as to perform the functions described herein will be apparent to persons skilled in the relevant art(s).

Aspects may also be implemented using a combination of both hardware and software. Accordingly, in one or more example aspects, the functions described may be implemented in hardware, software, firmware, or any combination thereof.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. A media stream receiving system for receiving and aligning a plurality of media streams to perform vertically accurate switching during media stream playout, the media stream receiving system comprising:

at least a pair of input ports configured to receive first and second media streams, respectively, each of the first and second media streams having a plurality of data packets;

at least one data packet parser configured to parse the data packets of each of the first and second media streams to identify first and second flow identifiers for the first and second media streams, respectively, and respective sequence number indexes of each parsed data packet of the first and second media streams;

a data packet recorder including at least a pair of recorder channels configured to receive the first and second media streams from the at least one data packet parser and to route the received first and second media streams to a target player selector that is configured to store the respective data packets of the first and second media streams based on the identified sequence number indexes in a single shared media stream buffer having at least a pair of separate memory banks;

a data packet player having a plurality of packet player channels and configured to fetch the respective data packets of the first and second media streams stored in the single shared media stream buffer and route the fetched data packets over at least one of the packet player channels to at least one media essence decapsulator for playout of the first and second media streams on at least one A/V device; and a memory pointer supervisor coupled between the data packet recorder and the data packet player and configured to provide data packet fetching control instructions to the data packet player based on the identified first and second flow identifiers and the identified sequence number indexes of each parsed data packet of the first and second media streams, wherein the data packet player includes a data flow selector that is coupled to the plurality of packet player channels and that is configured to fetch the respective data packets of the first and second media streams based on the data packet fetching control instructions received from the memory pointer supervisor, wherein the at least one media essence decapsulator controls a timing for the data packet player according to a system clock to fetch the respective data packets of the first and second media streams to prevent the data packet player from fetching at least one data packet at an address in the single shared media stream buffer before the packet recorder has stored a corresponding data packet at the address in the single shared media stream buffer, wherein the data flow selector of the data packet player is configured to vertically switch in a data packet domain the playout on the at least one A/V device based on the data packet fetching control instructions provided by the memory pointer supervisor, wherein the first and second media streams are separate, non-redundant data streams, and wherein the target player selector of the data packet recorder is further configured to store the respective data packets of the first media stream in a first memory bank of the single shared media stream buffer and the respective data packets of the second media stream in a second memory bank of the single shared media stream buffer.

2. The media stream receiving system according to claim 1, wherein the data packet player is configured to synchronously fetch the respective data packets of the first and second media streams to synchronize respective frames in the data packet domain of the first and second media streams for synchronized playout on the at least one A/V device.

3. The media stream receiving system according to claim 1, wherein the data packet player is further configured to directly fetch the respective data packets of the first and second media streams from the single shared media stream buffer and route the fetched data packets directly to the at least one media essence decapsulator for playout on the at least one A/V device without storing the fetched data packets in another media buffer before output to the at least one A/V device.

4. The media stream receiving system according to claim 1,
wherein the first and second media streams are primary and redundant media streams of single media content, and
wherein the data packet recorder is further configured to store the single media content in a single memory bank of the single shared media stream buffer based on the identified sequence number indexes of the respective data packets.

5. The media stream receiving system according to claim 1, wherein the data packet recorder is further configured to reorder the respective data packets of the first and second media streams based on the determined sequence number indexes and absorb packet delays variations of the first and second media streams by storing the received data packets based on the identified sequence number indexes of the respective data packets.

6. The media stream receiving system according to claim 1, wherein the data flow selector of the data packet player is further configured to fetch respective data packets from one of the first or second memory banks and simultaneously route the fetched respective data packets to the plurality of packet player channels of the data packet player coupled to a plurality of media essence decapsulators for simultaneously playing out the fetched respective data packets on first and second A/V device coupled thereto, respectively.

7. A media stream receiver for receiving and aligning a plurality of media streams to perform vertically accurate switching during media stream playout, the media stream receiver comprising:

at least one data packet parser configured to parse data packets of each of a plurality of streams to determine respective flow identifiers for each of the plurality of media streams and respective sequence number indexes of each parsed data packet of the plurality of media streams;

a data packet recorder configured to store the respective data packets of the plurality of media streams in a single shared media stream buffer having at least a pair of separate memory banks, wherein the data packets are stored in the single shared media stream buffer based on the determined sequence number indexes for each parsed data packet;

a data packet player configured to fetch the respective data packets of the plurality of media streams stored in the single shared media stream buffer and route the fetched data packets to at least one media essence decapsulator for playing out on at least one A/V device; and a memory pointer supervisor coupled between the data packet recorder and the data packet player and configured to provide data packet fetching control instructions to the data packet player based on the determined flow identifiers and the determined sequence number indexes of each parsed data packet of the plurality of media streams, wherein the data packet player fetches the respective data packets of the plurality of media streams based on the data packet fetching control instructions received from the memory pointer supervisor and is further configured to vertically switch the playing out on the at least one A/V device between the plurality of media streams based on the data packet fetching control instructions received from the memory pointer supervisor, and wherein the at least one media essence decapsulator controls a timing for the data packet player according to a system clock to fetch the respective data packets of the plurality of media streams to prevent the data packet player from fetching at least one data packet at an address in the single shared media stream buffer before the packet recorder has stored a corresponding data packet at the address in the single shared media stream buffer.

8. A media stream receiver for receiving and aligning a plurality of media streams to perform vertically accurate switching during media stream playout, the media stream receiver comprising:

at least one data packet parser configured to parse data packets of each of a plurality of streams to determine respective flow identifiers for each of the plurality of media streams and respective sequence number indexes of each parsed data packet of the plurality of media streams;

a data packet recorder configured to store the respective data packets of the plurality of media streams in a single shared media stream buffer having at least a pair of separate memory banks, wherein the data packets are stored in the single shared media stream buffer based on the determined sequence number indexes for each parsed data packet;

a data packet player configured to fetch the respective data packets of the plurality of media streams stored in the single shared media stream buffer and route the fetched data packets to at least one media essence decapsulator for playing out on at least one A/V device; and a memory pointer supervisor coupled between the data packet recorder and the data packet player and configured to provide data packet fetching control instructions to the data packet player based on the determined flow identifiers and the determined sequence number indexes of each parsed data packet of the plurality of media streams, wherein the data packet player fetches the respective data packets of the plurality of media streams based on the data packet fetching control instructions received from the memory pointer supervisor and is further configured to vertically switch the playing out on the at least one A/V device between the plurality of media streams based on the data packet fetching control instructions received from the memory pointer supervisor, and wherein the data packet player is configured to synchronously fetch the respective data packets of the plurality of media streams to synchronize respective frames in a data packet domain of the plurality of media streams for synchronized playout on the at least one A/V device.

9. The media stream receiver according to claim 8, wherein the data packet player is further configured to directly fetch the respective data packets of the plurality of media streams from the single shared media stream buffer and route the fetched data packets directly to the at least one media essence decapsulator for playout on the at least one A/V device without storing the fetched data packets in another media buffer before output to the at least one A/V device.

10. The media stream receiver according to claim 8, wherein the plurality of media streams are primary and redundant media streams of single media content, and wherein the data packet recorder is further configured to store the single media content in a single memory bank of the single shared media stream buffer based on the determined sequence number indexes of the respective data packets of the primary and redundant media streams.

11. The media stream receiver according to claim 8, wherein the data packet recorder is further configured to reorder the respective data packets of the plurality of media streams based on the determined sequence number indexes and absorb packet delays variations of the plurality of media streams by storing the received data packets based on the determined sequence number indexes of the respective data packets.

12. A media stream receiver for receiving and aligning a plurality of media streams to perform vertically accurate switching during media stream playout, the media stream receiver comprising:

at least one data packet parser configured to parse data packets of each of a plurality of streams to determine respective flow identifiers for each of the plurality of media streams and respective sequence number indexes of each parsed data packet of the plurality of media streams;

a data packet recorder configured to store the respective data packets of the plurality of media streams in a single shared media stream buffer having at least a pair of separate memory banks, wherein the data packets are stored in the single shared media stream buffer based on the determined sequence number indexes for each parsed data packet;

a data packet player configured to fetch the respective data packets of the plurality of media streams stored in the single shared media stream buffer and route the fetched data packets to at least one media essence decapsulator for playing out on at least one A/V device; and a memory pointer supervisor coupled between the data packet recorder and the data packet player and configured to provide data packet fetching control instructions to the data packet player based on the determined flow identifiers and the determined sequence number indexes of each parsed data packet of the plurality of media streams, wherein the data packet player fetches the respective data packets of the plurality of media streams based on the data packet fetching control instructions received from the memory pointer supervisor and is further configured to vertically switch the playing out on the at least one A/V device between the plurality of media streams based on the data packet fetching control instructions received from the memory pointer supervisor, wherein the plurality of media streams are first and second non-redundant data streams, and wherein the data packet recorder includes a target player selector that is configured to store the respective data packets of the first non-redundant data stream in a first memory bank of the single shared media stream buffer and the respective data packets of the second non-redundant data stream in a second memory bank of the single shared media stream buffer.

13. The media stream receiver according to claim 12, wherein the data packet player includes a data flow selector that is configured to fetch respective data packets from one of the first or second memory banks and simultaneously route the fetched respective data packets to a plurality of media essence decapsulators for simultaneously playing out the fetched respective data packets on first and second A/V device coupled thereto, respectively.

14. A media stream receiver for receiving and aligning a plurality of media streams to perform vertically accurate switching during media stream playout, the media stream receiver comprising:

a data packet recorder configured to receive a plurality of media streams experiencing packet delay variations and to reorder and store data packets of the plurality of media streams in a single shared media buffer based on parsed indexing information; and a data packet player configured to fetch the stored data packets in the single shared media buffer and to vertically switch playout of the plurality of media streams on at least one A/V device,
wherein the data packet player is further configured to route the fetched data packets to at least one media essence decapsulator for the playout on the at least one A/V device.

15. A media stream receiver for receiving and aligning a plurality of media streams to perform vertically accurate switching during media stream playout, the media stream receiver comprising:
a data packet recorder configured to receive a plurality of media streams experiencing packet delay variations and to reorder and store data packets of the plurality of media streams in a single shared media buffer based on parsed indexing information;
a data packet player configured to fetch the stored data packets in the single shared media buffer and to vertically switch playout of the plurality of media streams on at least one A/V device; and
at least one data packet parser configured to parse the data packets of each of a plurality of streams to identify respective flow identifiers for each of the plurality of media streams and the respective parsed indexing information of each parsed data packet of the plurality of media streams.

16. The media stream receiver according to claim 15, wherein the data packet recorder is further configured to store the respective data packets of the plurality of media streams in the single shared media stream buffer having at least a pair of separate memory banks, wherein the data packets are stored in the single shared media stream buffer based on the parsed indexing information for each parsed data packet.

17. The media stream receiver according to claim 16, further comprising a memory pointer supervisor coupled between the data packet recorder and the data packet player and configured to provide data packet fetching control instructions to the data packet player based on the identified flow identifiers and the parsed indexing information of each parsed data packet of the plurality of media streams.

18. The media stream receiver according to claim 17, wherein the data packet player fetches the respective data packets of the plurality of media streams based on the data packet fetching control instructions received from the memory pointer supervisor and is further configured to vertically switch the playing out on the at least one A/V device between the plurality of media streams based on the data packet fetching control instructions received from the memory pointer supervisor.

19. A media stream receiver for receiving and aligning a plurality of media streams to perform vertically accurate switching during media stream playout, the media stream receiver comprising:
a data packet recorder configured to receive a plurality of media streams experiencing packet delay variations and to reorder and store data packets of the plurality of media streams in a single shared media buffer based on parsed indexing information; and
a data packet player configured to fetch the stored data packets in the single shared media buffer and to vertically switch playout of the plurality of media streams on at least one A/V device,
wherein at least one media essence decapsulator controls a timing for the data packet player according to a system clock to fetch the respective data packets of the plurality of media streams to prevent the data packet player from fetching at least one data packet at an address in the single shared media stream buffer before the packet recorder has stored a corresponding data packet at the address in the single shared media stream buffer.

20. A media stream receiver for receiving and aligning a plurality of media streams to perform vertically accurate switching during media stream playout, the media stream receiver comprising:
a data packet recorder configured to receive a plurality of media streams experiencing packet delay variations and to reorder and store data packets of the plurality of media streams in a single shared media buffer based on parsed indexing information; and
a data packet player configured to fetch the stored data packets in the single shared media buffer and to vertically switch playout of the plurality of media streams on at least one A/V device,
wherein the data packet player is configured to synchronously fetch the respective data packets of the plurality of media streams to synchronize respective frames in a data packet domain of the plurality of media streams for synchronized playout on the at least one A/V device.

21. The media stream receiver according to claim 14, wherein the data packet player is further configured to directly fetch the respective data packets of the plurality of media streams from the single shared media stream buffer and route the fetched data packets directly to the at least one A/V device without storing the fetched data packets in another media buffer before output to the at least one A/V device.

22. The media stream receiver according to claim 14,
wherein the plurality of media streams are primary and redundant media streams of single media content, and
wherein the data packet recorder is further configured to store the single media content in a single memory bank of the single shared media stream buffer based on the parsed indexing information of the respective data packets of the primary and redundant media streams.

23. The media stream receiver according to claim 14, wherein the data packet recorder is further configured to reorder the respective data packets of the plurality of media streams based on the parsed indexing information and absorb packet delays variations of the plurality of media streams by storing the received data packets based on the parsed indexing information of the respective data packets.

24. A media stream receiver for receiving and aligning a plurality of media streams to perform vertically accurate switching during media stream playout, the media stream receiver comprising:
a data packet recorder configured to receive a plurality of media streams experiencing packet delay variations and to reorder and store data packets of the plurality of media streams in a single shared media buffer based on parsed indexing information; and
a data packet player configured to fetch the stored data packets in the single shared media buffer and to vertically switch playout of the plurality of media streams on at least one A/V device,
wherein the plurality of media streams are first and second non-redundant data streams, and
wherein the data packet recorder includes a target player selector that is configured to store the respective data packets of the first non-redundant data stream in a first memory bank of the single shared media stream buffer and the respective data packets of the second non-redundant data stream in a second memory bank of the single shared media stream buffer.

25. The media stream receiver according to claim 24, wherein the data packet player includes a data flow selector that is configured to fetch respective data packets from one of the first or second memory banks and simultaneously route the fetched respective data packets to a plurality of media essence decapsulators for simultaneously playing out the fetched respective data packets on first and second A/V device coupled thereto, respectively.

\* \* \* \* \*